United States Patent [19]

Fujimoto

[11] Patent Number: 4,984,102
[45] Date of Patent: Jan. 8, 1991

[54] INFORMATION SIGNAL RECORDING APPARATUS AND APPARATUS FOR REPRODUCING THE SAME

[75] Inventor: Ryo Fujimoto, Kanagawa, Japan

[73] Assignee: Canon Kabushiki Kaisha, Tokyo, Japan

[21] Appl. No.: 235,427

[22] Filed: Aug. 22, 1988

[30] Foreign Application Priority Data

Aug. 31, 1987 [JP] Japan .................. 62-215155
Oct. 16, 1987 [JP] Japan .................. 62-261004

[51] Int. Cl.$^5$ .................. G11B 15/14; G11B 5/02
[52] U.S. Cl. .................. 360/65; 360/68
[58] Field of Search .................. 360/65, 67, 68

[56] References Cited

U.S. PATENT DOCUMENTS

| 2,901,737 | 8/1959 | Stovall, Jr. | 360/68 |
| 4,244,008 | 1/1981 | Holt | 360/68 |
| 4,479,152 | 10/1984 | Chi | 360/68 |
| 4,564,869 | 1/1986 | Baumeister | 360/68 |
| 4,794,469 | 12/1988 | Kaido et al. | 360/68 |

Primary Examiner—Vincent P. Canney
Attorney, Agent, or Firm—Robin, Blecker, Daley & Driscoll

[57] ABSTRACT

The information signal recording apparatus of this invention is adapted to form a plurality of concentric recording tracks over a disc-shaped recording medium by recording information signals on the disc-shaped recording medium. This recording apparatus is arranged to first emphasize a predetermined high-band frequency component of an input information signal in accordance with the position of a recording track on such a recording medium on which the information signal is to be recorded, then implement angle modulation on the information signal, and subsequently record the angle-modulated information signal on the recording medium. Accordingly, it is possible to optimally record the information signals on the disc-shaped recording medium, anywhere from the outer circumference to the inner circumference, without involving any influence of noise. The information signal reproducing apparatus of this invention is adapted to reproduce information signals from such a disc-shaped recording medium over which a plurality of concentric recording tracks are formed. This reproducing apparatus is arranged to suppress a predetermined high-band frequency component of an information signal to be reproduced in accordance with the position of the recording track on the recording medium from which the information signal is to be reproduced. Accordingly, it is possible to optimally reproduce the information signals on the recording medium, anywhere from the outer circumference to the inner circumference, without involving any influence of noise.

19 Claims, 24 Drawing Sheets

INFORMATION SIGNAL RECORDING APPARATUS AND APPARATUS FOR REPRODUCING THE SAME

BACKGROUND OF THE INVENTION

1. Field of the Invention

The present invention relates to an apparatus for recording information signals on a recording medium and an apparatus for reproducing information signals recorded on the same.

2. Description of the Related Art

A magnetic type of recording and reproducing apparatus is known as one example of such an information signal recording and reproducing apparatus. Such a magnetic recording and reproducing apparatus typically employs so-called emphasis as a process for reducing noise components which may be introduced into a signal during its recording.

In general, when video signals are to be frequency-modulated and magnetically recorded, various adverse influences may occur such as moire due to side-band signals only if the deviation of frequency modulation is increased in order to reduce noise components. The above-described emphasis is a process which is widely used to eliminate such adverse influences. The emphasis process typically comprises the steps of increasing only the deviation of the high-band frequency components of an input video signal, recording the input video signal, and recovering the original level of the input video signal prior to reproducing it (that is, de-emphasis), whereby the influence of noise components during recording and reproduction is reduced.

FIG. 1(a) shows a typical example of the spectrum of noise components after frequency modulation and frequency demodulation. As is generally known, if the emphasis and de-emphasis processes are employed, such a spectrum is converted into a spectrum such as that shown in FIG. 1(b), so that the noise components can be reduced.

The above-described emphasis falls into two kinds of process. One process is called fixed emphasis and the other process is called dynamic emphasis These two processes will be described below with reference to a frequency modulation type of magnetic video-signal recording apparatus to which these processes are respectively applied.

FIG. 2 diagrammatically shows the construction of a magnetic recording apparatus of the type which uses the fixed emphasis. The illustrated magnetic recording apparatus includes a fixed emphasis circuit 200, a limiter circuit 201, a frequency modulation circuit 202, a recording amplifier 203 and a magnetic head 204 as well as a magnetic sheet 205 which serves as a magnetic recording medium. The fixed emphasis circuit 200 commonly has an amplification characteristic such as that shown in FIG. 3(a), and is constituted by a very simple circuit such as that shown in FIG. 3(b). Since the construction shown in FIG. 3(b) is of a general type, the description thereof is omitted.

Referring to FIG. 2, when the fixed emphasis circuit 200 receives an input video signal, the fixed emphasis circuit 200 amplifies the high-band frequency components of the input video signal on the basis of the amplification characteristic shown in FIG. 3(a) described above. As a result, sharp spike pulses called a white peak and a dark peak respectively occur in the steep rising and falling edges of a video signal, as shown in FIG. 2, and form a cause of a known inverted white peak or the like. For this reason, the limiter circuit 201 restricts the level of the video signal to a predetermined value to remove the spike pulses, and the signal thus shaped is frequency-modulated by the frequency modulation circuit 202. In consequence, the frequency-modulated signal output from the frequency modulation circuit 202 is a signal obtained by frequency-modulating the signal whose high-band frequency components are amplified by the fixed emphasis circuit 200. It follows, therefore, that frequency modulation has been effected such that the deviation of the high-band frequency components is large compared with that of the low-band frequency components.

The signal thus frequency-modulated is amplified by the recording amplifier 203 and then recorded through the magnetic head 204 on the magnetic sheet 205 which is rotated by a motor (not shown).

FIG. 4 diagrammatically shows the construction of a magnetic recording apparatus of the type which employs the dynamic emphasis. The illustrated apparatus includes a dynamic emphasis circuit 400, a limiter circuit 401, a frequency modulation circuit 402, a recording amplifier 403 and a magnetic head 404 as well as a magnetic sheet 405 which serves as the magnetic recording medium. The dynamic emphasis circuit 400 has a characteristic in which its amplification ratio non-linearly varies in accordance with the level of an input signal. Accordingly, the dynamic emphasis circuit 400 is capable of achieving a noise reduction effect higher than the fixed emphasis circuit 200. FIG. 5(a) is a graphic representation showing the amplification characteristic of the dynamic emphasis circuit 400, and FIG. 5(b) diagrammatically shows a concrete example of the construction of the same. Since the construction shown in FIG. 5(b) is of a general type, the description thereof is omitted.

Referring to FIG. 4, when the dynamic emphasis circuit 400 receives an input video signal, the dynamic emphasis circuit 400 amplifies the high-band frequency components of the input video signal on the basis of the amplification characteristic shown in FIG. 5(a) described above. As a result, a white peak and a dark peak respectively occur in the rising and falling edges of the video signal, as in the case of the fixed emphasis circuit 200 described above, but as the level of the input video signal is lower, the high-band frequency components are amplified at a higher amplification ratio. Accordingly, adaptive amplification is performed in accordance with the level of each input video signal.

The video signal which has thus been subjected to the dynamic emphasis is restricted in amplitude by the limiter circuit 401, and thus the white and dark peaks are removed. The signal thus shaped is frequency-modulated by the frequency modulation circuit 402 and then recorded through the magnetic head 404 on the magnetic sheet 405 which is rotated by a motor (not shown).

As described above, when a video signal is recorded by a recording apparatus having the above-described emphasis circuit and is recovered by a reproducing apparatus through the de-emphasis circuit thereof, the noise components contained in the high-band frequency components of the obtained signal are reduced as shown in FIG. 1(b). Such a signal can be easily reproduced by a reproduction apparatus such as that shown in FIG. 6.

The reproducing apparatus shown in FIG. 6 includes, in addition to a magnetic sheet 600 which serves as a magnetic recording medium, a magnetic head 601, a pre-amplifier 602, a frequency demodulation circuit 603 and a de-emphasis circuit 604. The signal reproduced from the magnetic sheet 600 by the magnetic head 601 is amplified by the pre-amplifier 602, demodulated by the frequency demodulation circuit 603, and applied to the de-emphasis circuit 604 which has the characteristics reverse to those of the fixed emphasis circuit 200 and the dynamic emphasis circuit 604. Thus, the original video signal is recovered and output.

When the noise components of a signal are to be reduced by using each of the above-described emphasis circuits, the deviation of the high-band frequency components of the signal increases during frequency modulation as the amplification ratio of the high-band frequency components is increased. As a result, it is possible to obtain a large reduction effect for the noise components.

However, if the amplification ratio of the high-band frequency components is made excessively high, a known inverted white peak occurs during frequency demodulation in a reproduction process, and it may become impossible to recover the signal correctly.

The inverted white peak is a phenomenon in which, if a signal containing a sharp peak generated by an emphasis circuit is recorded after frequency modulation, a zero crossing point may be lost in a spectral portion of a reproduced signal that corresponds to the sharp peak, with the result that, if the recorded signal is a video signal, a signal which originally represents white is recovered as a signal which represents black, or vice versa. To prevent the occurrence of such an inverted white peak, signals, after the above-described emphasis, are limited in amplitude by a limiter circuit to suppress the level of the aforesaid peak to some degree.

However, if signals are excessively limited, a phenomenon known as smear occurs and causes reproduced signals to deteriorate. For this reason, the fixed emphasis is limited in increasing the amplification ratio.

The dynamic emphasis has the problem that, since its non-linear characteristic cannot be exactly set when the interchangeability between devices is taken into account, it is impossible to increase the amplification ratio beyond a certain degree.

In particular, there has recently been a strong demand for high-quality recording and reproduction of video signals. In response to this demand, so-called high-band recording is utilized for recording video signals after frequency modulation using a carrier signal of high frequency. In such high-band recording, it is necessary to increase the amplification ratio in emphasis in order to reduce noise components. In a conventional emphasis process, however, since it is difficult to increase the amplification ratio in emphasis as described previously, it has been impossible to achieve satisfactory reduction of noise components.

Also, if a disc-shaped magnetic sheet is used as the recording medium, the magnetic sheet is rotated at a predetermined rotational speed, and frequency-modulated video signals are recorded on the rotating magnetic sheet. In this case, a plurality of recording tracks are concentrically formed on the magnetic sheet, and the relative speed of the magnetic sheet with respect to the magnetic head on the recording tracks in the outer circumferential portion differs from that on the recording tracks in the inner circumferential portion. As a result, the shortest recording wavelengths grow shorter from the outer circumference to the inner circumference. For this reason, if the S/N (signal-to-noise) ratio is to be improved by emphasis as described above when the aforesaid video signals are recorded after an emphasis process such as that described above, the inverted white peak occurs on the inner circumferential portion if emphasis is effected on signals to be recorded on the outer circumferential portion to such an extent that the inverted white peak does not occur.

On the other hand, if emphasis is effected on signals to be recorded on the inner circumferential portion to such an extent that the inverted white peak does not occur, no inverted white peak occurs in the outer circumferential portion, but no great improvement in S/N ratio is obtained. In a conventional type of emphasis process, emphasis can only be effected to such an extent that no inverted white peak occurs on the inner or outer circumferential portion. Therefore, a recording operation which is disadvantageous in terms of the S/N ratio must be performed.

Also, VTRs (video tape recorders) or VD systems (video disc systems) for home use, if visually tolerable, need not necessarily record or reproduce television signals with fidelity as high as that of the broadcasting VTRs. With this viewpoint, the following noise reduction systems are commonly adopted in VTRs or VD systems for home use. Such noise reduction systems fall into two major types. One type is called an addition type and the other a subtraction type. In the addition type of noise reduction system, a reproduced luminance signal is divided into a high-band signal and a low-band signal by means of a filter. In general, noise which is relatively conspicuous appears as a flat object reproduced from an input image, for example, a large-area flat object such as the sky or a wall, and there is a tendency for such noise to gather about a low-level portion of the high-band signal. In the addition type of noise reduction system, such noise is removed by a slicer circuit, and the output of the slicer circuit, after level matching, is superimposed on the low-band signal. In the subtraction type of noise reduction system, noise is extracted from the high-band signal by means of a limiter, and the noise is reversed in phase and superimposed on an input luminance signal, thereby cancelling the noise.

In addition, a noise reduction circuit called the "DDC (double differential circuit)" has been proposed as a modified version of the former addition type noise reduction circuit. The DDC is designed to increase the level of a high-band signal to some extent by means of a quadratic differential type phase compensating circuit, to add such a high-band signal to a low-band signal, thereby increasing the sharpness of the contour of an input image.

Furthermore, a horizontal-correlation noise reduction circuit employing a one-horizontal-scanning-period delay circuit (or 1-H delay line) is proposed as a high-performance version of such a noise reduction system. The horizontal-correlation noise reduction circuit makes use of the fact that, since a high line correlation (high vertical correlation) is established between a reproduced luminance signal and a 1-H delayed signal, noise components without line correlation are obtained as the difference output therebetween. The residual noise components which have thus been extracted are passed through a limiter and then superimposed on the original signal (as disclosed in, for example, Japanese Patent Application Laid-open No. Sho 60-30285). A further improved version (as disclosed in, for example, Japanese Patent Application Laid-open No. Sho 60-121885) is also proposed or actually utilized.

In all of the above-described conventional examples, however, whichever noise reduction system may be employed, noise reduction is achieved at the expense of a decrease in the high-band frequency components, an increase in waveform distortion, and an increase in waveform distortion in a portion without vertical correlation. In particular, as the amount of noise reduction is increased, these disadvantages grow large.

Furthermore, a system in which a disc-shaped recording medium (a magnetic or optical type of disc) is rotated at a constant angular velocity and video signals which are frequency-modulated with a fixed frequency are recorded on such a recording medium encounters the following problem. That is, since the recording wavelengths grow shorter as the recording proceeds toward the inner circumference of the recording medium, the S/N ratio deteriorates.

The above-described problems will be described in greater detail below with reference to FIGS. 7 and 8. FIG. 7 diagrammatically shows a typical basic circuit for effecting noise reduction and FIG. 8 shows in graphic form the waveform provided at each portion of the circuit shown in FIG. 7.

First, a signal of a waveform such as that shown in part S2 of FIG. 8 is input to a low-pass filter (LPF) 700 and a high-pass filter (HPF) 701 which are shown in FIG. 7. One signal is filtered by the low-pass filter 700 to be transformed into a low-band signal of a waveform such as that shown in part S2 of FIG. 8, and then applied to an adder 702. The other signal is filtered by the high-pass filter 701 to be transformed into a high-band signal of a waveform such as that shown in part S3 of FIG. 8, and then applied to a limiter 703. The limiter 703 slices a low-level portion of the high-band signal in the range represented as D in part S3 of FIG. 8 to provide a signal of a waveform such as that shown in part S4(*a*) of FIG. 8. When this signal is added to the signal S2 in the adder 702, a signal of a waveform such as that shown in part S5(*a*) of FIG. 8 is obtained. As can be seen from the waveform S5(*a*), the noise is greatly reduced but the high-frequency portions of the rising and falling edges (contour portion) of the signal are remarkably rounded. As a result, a picture devoid of sharpness is reproduced.

If the slicing level of the limiter 703 is further decreased, the limiter 703 outputs a waveform such as that shown in part S4(*b*) of FIG. 8, and its final output waveform becomes a waveform such as that shown in part S5(*b*) of FIG. 8. In this case, the degree of noise reduction is small, but the sharpness of the reproduced image is relatively great since its waveform distortion is small.

Various improvements have recently been proposed with respect to the noise reduction circuit described above with reference to the most basic example thereof, and the effect of noise reduction has been significantly improved. However, there is still a limitation in that, if the amount of noise reduction is increased, a significant waveform distortion occurs as shown in part S5(*a*) of FIG. 8 and in that, if the waveform distortion is suppressed, the amount of noise reduction decreases as shown in part S5(*b*) of FIG. 8.

As is known, still video systems for recording and reproducing still pictures are arranged such that still picture signals are frequency-modulated and concentrically recorded on a 2-in. dia. magnetic disc of up to fifty fields. The luminance signal of each picture signal is frequency-modulated in the range of from 6 MHz to 7.5 MHz, which is equivalent to the range from sync chip to white peak. The chrominance signal of the same, after a color-difference line-sequential process, is frequency-modulated by using about 1 MHz as the center frequency and then recorded on the above-described disc. From this, it follows that signals of substantially the same spectrum are recorded concentrically from the outer circumference to the inner circumference. As a result, recording wavelengths grow shorter from the outer circumference toward the inner circumference.

As is well known, as the recording waveform grows short, the C/N ratio (carrier-to-noise ratio) of an electromagnetic system deteriorates. Hence, the S/N ratio of the picture signals which have been thus recorded and reproduced deteriorates. For this reason, although a certain degree of image quality can be achieved around the outermost circumference of a magnetic disc, the image quality progressively deteriorates as recording proceeds from the outer circumference to the inner circumference. Around the innermost circumference, luminance signals distinctly deteriorate in S/N ratio. If an enhanced carrier frequency is used in frequency modulation to allow for high-definition reproduction, the S/N ratio deteriorates to a remarkable extent.

SUMMARY OF THE INVENTION

It is a first object of the present invention to provide apparatus for recording and reproducing information signals which can solve the above-noted problems.

It is a second object of the present invention to provide an information signal recording apparatus which is capable of optimally recording information signals on a disc-shaped recording medium, anywhere from the inner circumference to the outer circumference, without involving any influence of noise.

It is a third object of the present invention to provide an information signal reproducing apparatus in which, when information signals recorded on recording tracks which are concentrically formed over a disc-shaped recording medium are to be reproduced, it is possible to optimally reproduce such information signals, without any influence of noise, anywhere from the inner circumference to the outer circumference on the disc-shaped recording medium.

It is a fourth object of the present invention to provide an information signal reproducing apparatus in which, when information signals recorded on recording tracks which are concentrically formed over a disc-shaped recording medium are to be reproduced, it is possible to implement optimum noise reduction upon such information signals, without any insufficiency nor oversufficiency, anywhere from the inner circumference to the outer circumference on the disc-shaped recording medium.

To achieve the first and second objects, in one embodiment of the present invention, there is provided an information signal recording apparatus arranged to concentrically form a plurality of recording tracks on a disc-shaped recording medium by recording information signals on the disc-shaped recording medium. This apparatus includes emphasis means arranged to receive an input information signal to emphasize a predetermined high-band frequency component of the input information signal; angle modulation means for forming and outputting an angle-modulated information signal by angle-modulating the information signal whose predetermined high-band frequency component has been emphasized by, and supplied from, the emphasis means; recording means for forming a recording track on the disc-shaped recording medium by recording the angle-modulated information signal output from the angle modulation means on an arbitrary concentrical region on the disc-shaped recording medium; and control means for controlling, in accordance with the position of a recording track on the disc-shaped recording medium on which the recording means is recording the angle-modulated information signal, the extent of emphasis which is to be effected by the emphasis means with respect to the predetermined high-band frequency component of the information signal.

To achieve the third object, in another embodiment of the present invention, there is provided an information signal reproducing apparatus arranged to reproduce information signals from a disc-shaped recording medium, a plurality of recording tracks being concentrically formed over the disc-shaped recording medium by recording the information signals thereon. This apparatus includes reproduction means arranged to trace a portion of the plurality of recording tracks formed over the disc-shaped recording medium and then to reproduce an information signal recorded on the traced recording track; suppression means for suppressing a predetermined high-band frequency component of the information signal reproduced by the reproduction means; and control means for controlling, in accordance with the position of the recording track traced by the reproduction means on the disc-shaped recording medium, the amount of suppression which is effected by the suppression means with respect to the predetermined high-band frequency component of the information signal.

To achieve the fourth object, in another embodiment of the present invention, there is provided an information signal reproducing apparatus arranged to reproduce information signals from a disc-shaped recording medium, a plurality of recording tracks being concentrically formed over the disc-shaped recording medium by recording the information signals thereon. This apparatus includes reproduction means arranged to trace a portion of the plurality of recording tracks formed over the disc-shaped recording medium and then to reproduce an information signal recorded on the traced recording track; noise reduction means arranged to reduce a noise component of the information signal reproduced by the reproduction means and then to output the information signal; and control means for controlling, in accordance with the position of the recording track traced by the reproduction means on the disc-shaped recording medium, the amount of reduction which is effected by the suppression means with respect to the noise component of the information signal.

The above and other objects and features of the invention will become apparent from the following detailed description of embodiments thereof taken in connection with the accompanying drawings.

DETAILED DESCRIPTION OF THE PREFERRED EMBODIMENTS

Preferred embodiments of the present invention will be described below with reference to the accompanying drawings.

A first embodiment of the present invention will be explained with illustrative reference to a still video device to which the present invention is applied.

For the sake of simplicity, it is assumed that the still video device according to the first embodiment is constructed including only circuits associated with luminance signal processing.

Figure 9A:
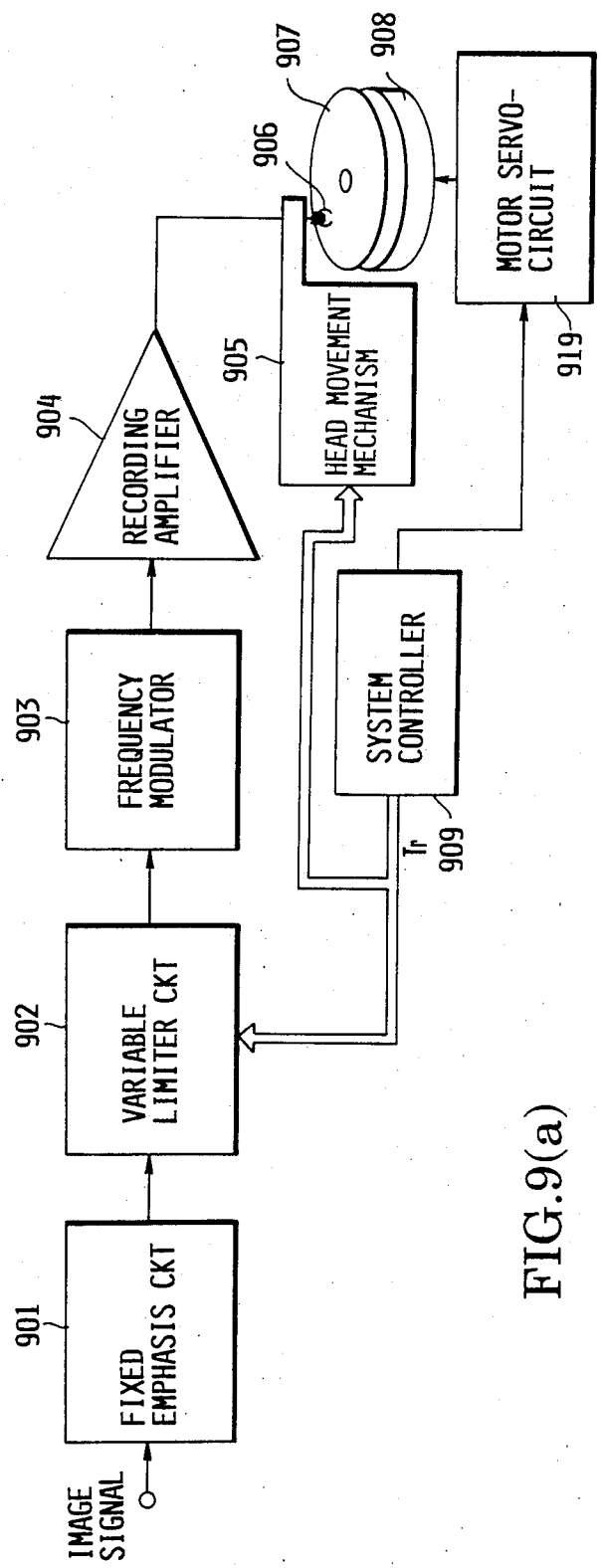
FIG. 9(a) is a block diagram of the construction of the recording system of a still video device to which a first embodiment of the present invention is applied.
Figure 9B:
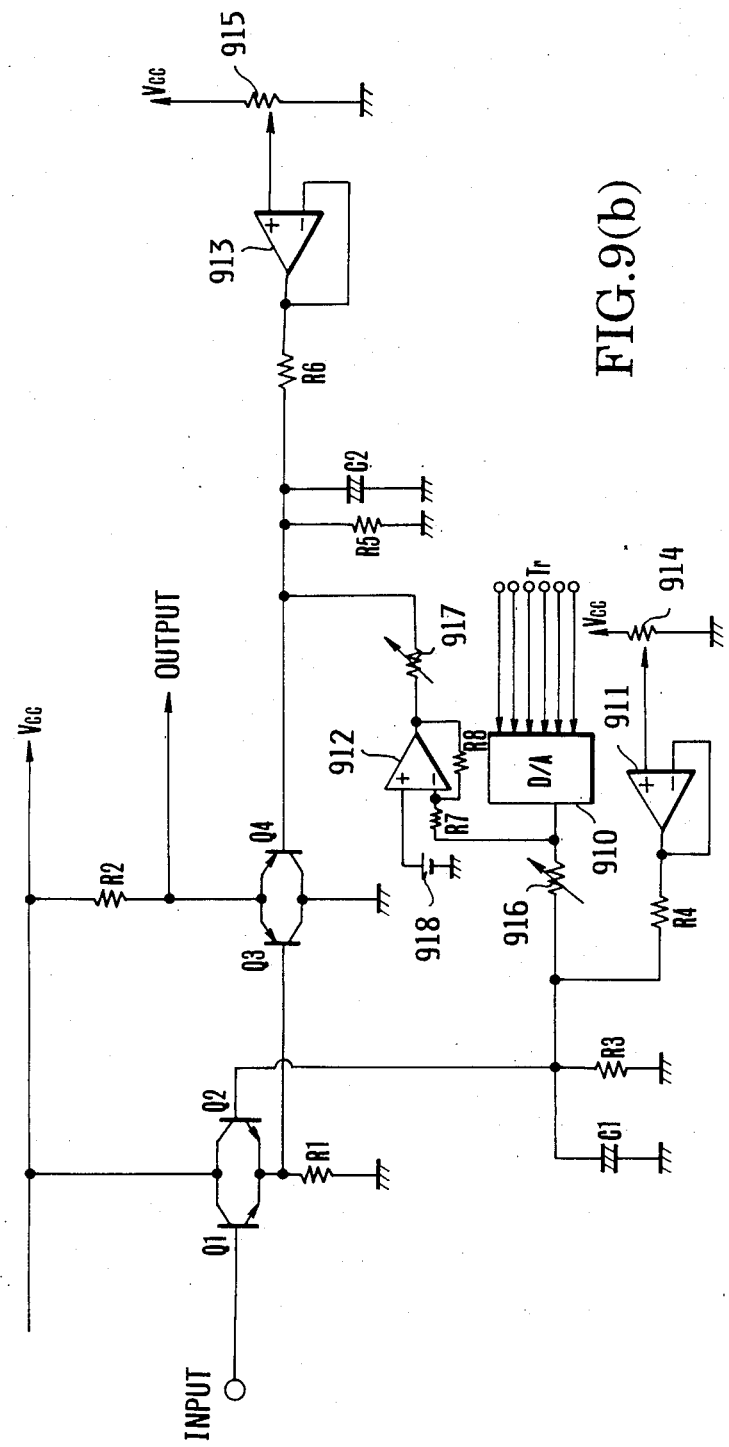
FIG. 9(b) is a circuit diagram of one concrete example of the construction of a variable limiter circuit used in the recording system of FIG. 9(a)

FIG. 9(a) is a schematic block diagram of the recording system of the still video device according to the first embodiment of the present invention. FIG. 9(b) is a circuit diagram showing one concrete example of the circuit construction of a variable limiter circuit used in the recording system of FIG. 9(a).

The following is a description of the recording operation according to the first embodiment, taken in conjunction with FIGS. 9(a) and 9(b).

Figure 2:
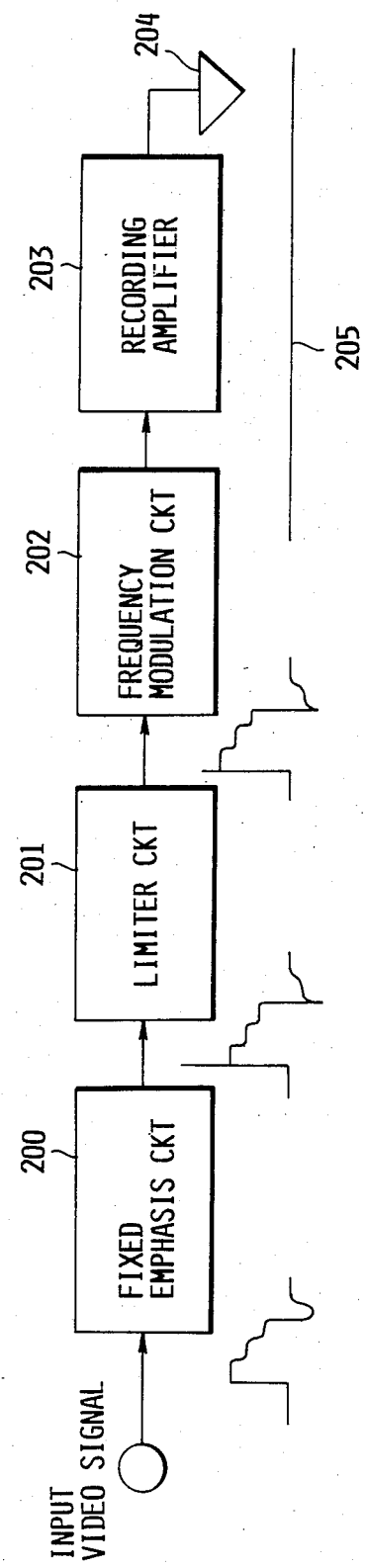
FIG. 2 is a block diagram of the construction of a magnetic recording apparatus of a conventional type employing a fixed emphasis circuit.
Figure 3A:
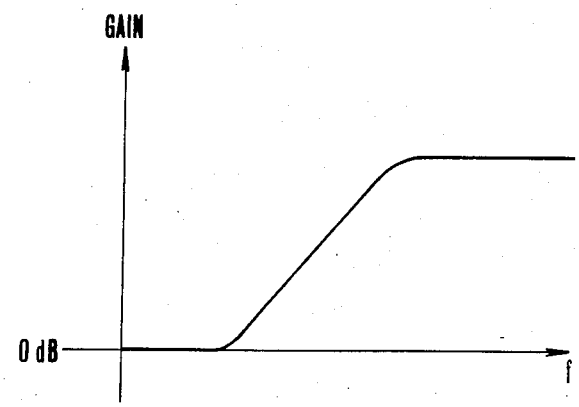
FIG. 3(a) is a characteristic chart of the fixed emphasis circuit shown in FIG. 2.
Figure 3B:
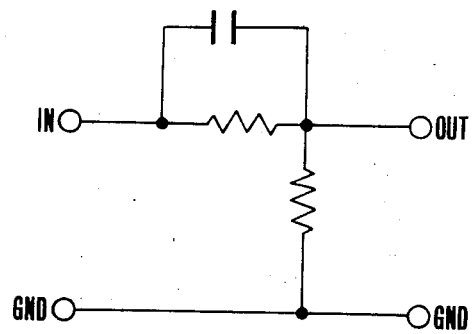
FIG. 3(b) is a circuit diagram of the circuit shown in FIG. 2.
Figure 4:
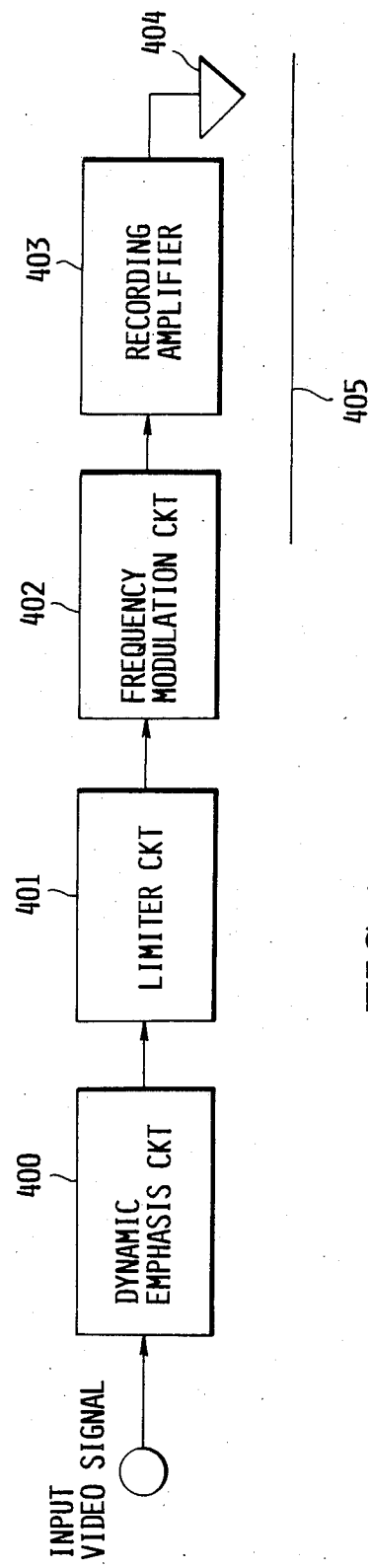
FIG. 4 is a block diagram of the construction of of a magnetic recording apparatus of a conventional type employing a dynamic emphasis circuit.
Figure 5A:
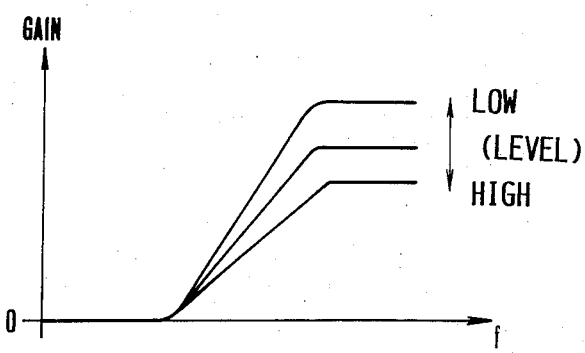
FIG. 5(a) is a characteristic chart of the dynamic emphasis circuit shown in FIG. 4.
Figure 5B:
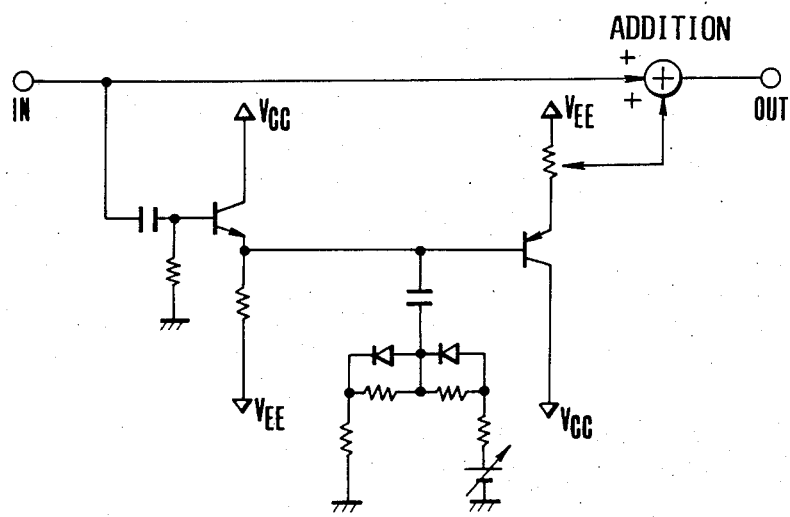
FIG. 5(b) is a circuit diagram of the circuit shown in FIG. 4.
Figure 6:
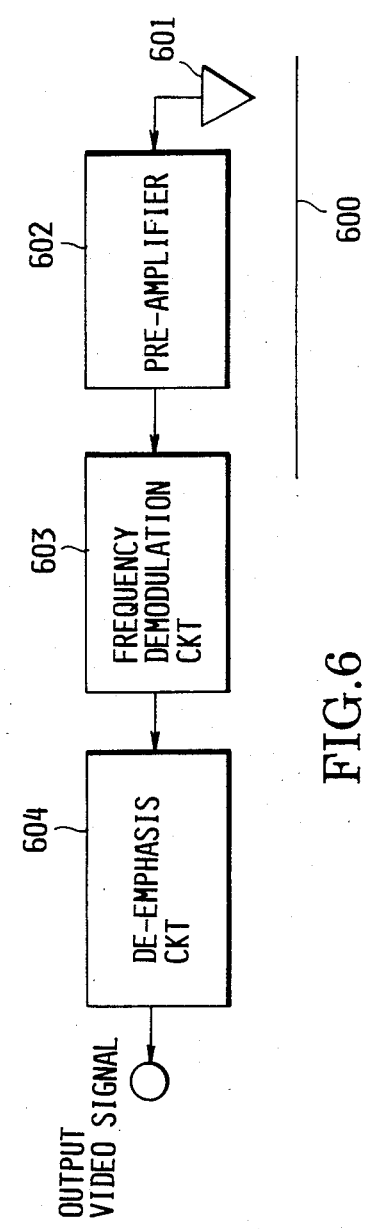
FIG. 6 is a block diagram of the construction of a magnetic reproducing apparatus of a conventional type.
Figure 7:
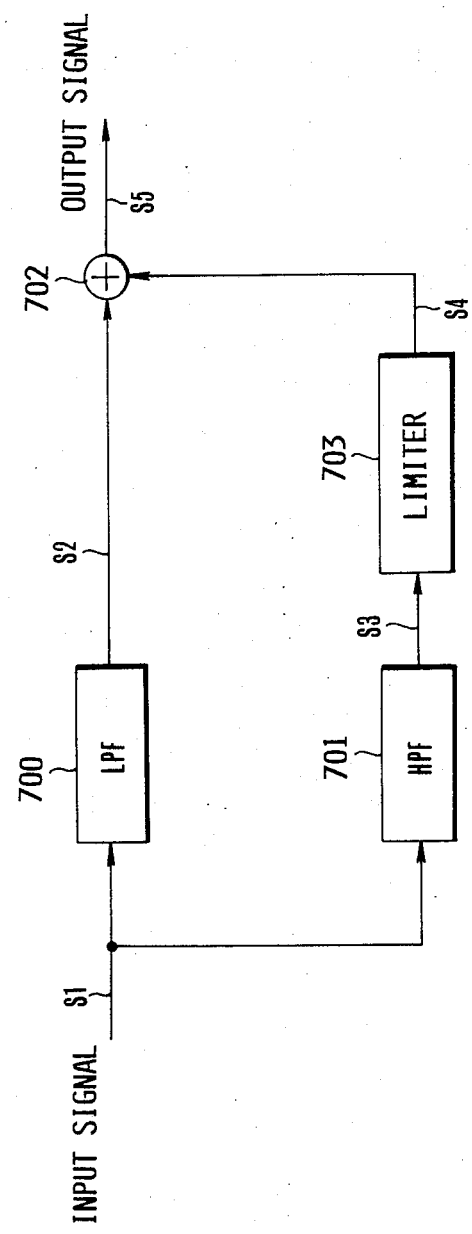
FIG. 7 is a block diagram of the construction of a noise reduction circuit of a conventional type.
Figure 8:
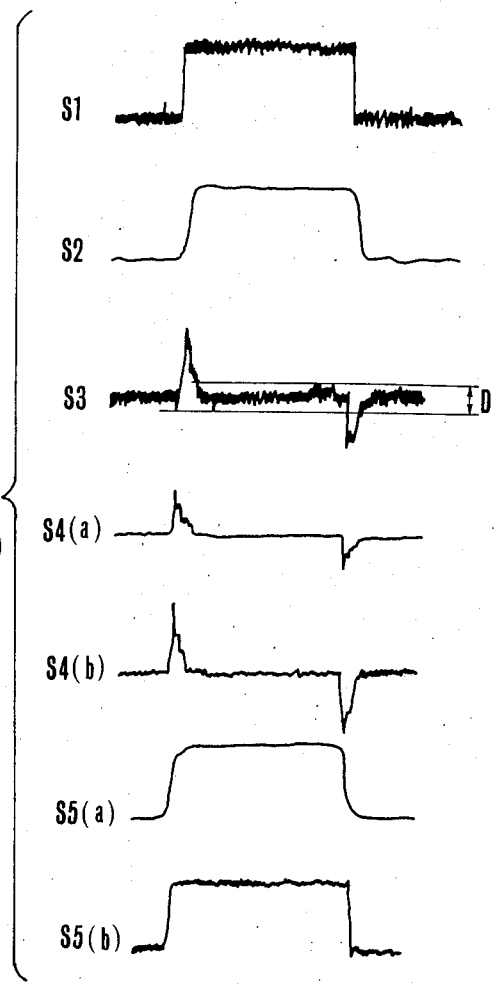
FIG. 8 shows in graphic form the waveform provided at each portion of the circuit shown in FIG. 7.

Referring first to FIG. 9(a), a fixed emphasis circuit, which is represented by reference numeral 901, emphasizes a high-band frequency component of an input image signal. An emphasis process executed by the fixed emphasis circuit 901 is similar to the one which has previously been mentioned in the description of the related art. For example, if a step waveform signal is input to the fixed emphasis circuit 901, the circuit 901 emphasizes, as shown in the above-described FIG. 2, the high-band frequency component of the input signal to output a waveform signal containing spike pulses at its edge portions.

The signal which has been emphasized in such a fixed emphasis circuit 901 is supplied to a variable limiter circuit 902. The variable limiter circuit 902 is constructed as shown in FIG. 9(b) which will be referred to later, and suppresses the level of the emphasized signal between a white limit level and a dark limit level and outputs the suppressed video signal. This video signal whose level has been suppressed by the variable limiter circuit 902 is frequency-modulated by the frequency modulator 903, amplified by a recording amplifier 904, and supplied to a magnetic head 906. The video signal thus processed is recorded on a magnetic sheet 907 which is rotated with a constant velocity by a motor 908. The motor 908 is adapted to run at a predetermined rotational speed under the control of a motor servo-circuit 919 which operates in accordance with an instruction from a system controller 909.

The magnetic head 906 can be moved over the magnetic sheet 907 in the radial direction thereof by a head movement mechanism 905. The head movement mechanism 905 responds to a track specifying signal Tr which is supplied from the system controller 909 to cause the magnetic head 906 to move over the magnetic sheet 907 to the recording track position specified by the track specifying signal Tr.

The operation of the variable limiter circuit 902 shown in FIG. 9(a) will be described below with reference to FIG. 9(b).

As shown diagrammatically in FIG. 9(b), the variable limiter circuit 902 includes transistors Q1 to Q4, resistors R1 to R8, capacitors C1 and C2, amplifiers 911 to 913, a digital-to-analog (D/A) converter 910, variable resistors 914 to 917 for adjustment purposes, and a constant voltage source 918.

In FIG. 9(b), the video signal which has been emphasized by the fixed emphasis circuit 901 is input to the base of the transistor Q1.

The transistor Q2 is a transistor the emitter and collector of which are connected in common to those of the transistor Q1, and such a configuration effects suppression of a dark level.

It is to be noted that the above-described dark limit level is determined by the base potential of the transistor Q2 which is formed by adding the DC voltage output from the D/A converter 910 to the DC potential established by the variable resistor 914. In other words, during recording, the system controller 909 also supplies to the variable limiter circuit 902 the track specifying signal Tr for designating the position of the magnetic head 906 on the magnetic sheet 907 as described previously. In the still video device of the first embodiment, fifty concentric recording tracks are formed over the magnetic sheet 907, for example, from the outer circumference toward the inner circumference. The track specifying signal Tr is supplied to the head movement mechanism 905 and the variable limiter circuit 902 in the form of a 6-bit digital signal representing any one of the track numbers from 1 to 50.

The 6-bit track specifying signal Tr is input to the D/A converter 910 of the variable limiter circuit 902, and the D/A converter 910 outputs a DC voltage signal which corresponds to the track number specified by the track specifying signal Tr. The variable resistor 914 serves to set the dark limit level of a video signal to be recorded on the outermost track by varying a power source voltage Vcc. A DC voltage signal, which is formed by adjusting the variable resistor 914, is output through the amplifier 911 which operates as a buffer.

Then, the DC voltage signal output from the D/A converter 910 and the DC voltage signal supplied through the variable resistor 914 and the amplifier 911 are delivered to an adder constituted by the resistors R4 and R3 and the variable resistor 916. These DC voltage signals are added together by the adder, and the result is supplied to the base of the transistor Q2 so that the dark limit level is set.

In the above-described manner, the base potential of the transistor Q2 is varied in accordance with the DC voltage output from the D/A converter 910, and the DC voltage output from the D/A converter 910 is varied in accordance with the track specifying signal Tr output from the system controller 909. Therefore, the dark limit level at the transistor Q2 can be adaptively set in accordance with the specified track position.

The signal whose dark level has been suppressed is supplied from the common emitter of the transistors Q1 and Q2 to the base of the transistor Q3.

The transistor Q3 is a transistor the collector and emitter of which are connected in common to those of the transistor Q4, and such a configuration suppresses a white level.

It is to be noted that the above-described white limit level is determined by the the base potential of the transistor Q4, and is obtained by adding the DC potential established by the variable resistor 915 to the DC potential which is output from the D/A converter 910 and the polarity of which is inverted by an inverting amplifier 912 with respect to the polarity of the varying potential.

Similarly to the above description, the DC voltage signal which has been output by the D/A converter 910 in accordance with the track specifying signal Tr from the system controller 909 is applied to the inverting amplifier 912. After the DC voltage signal has been output from the inverting amplifier 912, the extent of variation of the signal is adjusted by the variable resistor 917. The variable resistor 915 serves to set the white limit level of a video signal to be recorded on the outermost track by varying the power source voltage Vcc. A DC voltage signal, which is formed by adjusting the variable resistor 914, is output through the amplifier 911 which operates as a buffer.

Then, the DC voltage signal output from the D/A converter 910 and the DC voltage signal supplied through the variable resistor 915 and the amplifier 913 are delivered to an adder constituted by the resistors R5 and R6 and the variable resistor 917. These DC voltage signals are added together by the adder, and the result is supplied to the base of the transistor Q4 so that the white limit level is set.

In the above-described manner, the base potential of the transistor Q4 is varied in accordance with the DC voltage output from the D/A converter 910, and the DC voltage output from the D/A converter 910 is varied in accordance with the track specifying signal Tr output from the system controller 909. Therefore, the white limit level at the transistor Q4 can be adaptively set in accordance with the specified track position.

Thus, the luminance signal which has been emphasized is limited between the dark limit level and the white limit level which are both set in accordance with each track position, and is then supplied to the frequency modulator 903 which follows the variable limiter circuit 902. In the variable limiter circuit 902, the limited signal is frequency-modulated as described previously and then recorded on the magnetic sheet 907 by the magnetic head 906.

As described above, when an information signal is to be recorded on a recording track located in the inner circumferential portion of the magnetic sheet in which portion inverted white peaks easily occur, the occurrence of such inverted white peaks is suppressed by limiting the information signal by an amount far greater than that recorded on a recording track formed in the outer circumferential portion. Conversely, the information signal to be recorded on the recording track in the outer circumferential portion is limited to a slight extent. Accordingly, in the outer circumferential portion, it is possible to reduce the deterioration of image quality due to the above limiting process during a recording operation.

Figures 10, 11:
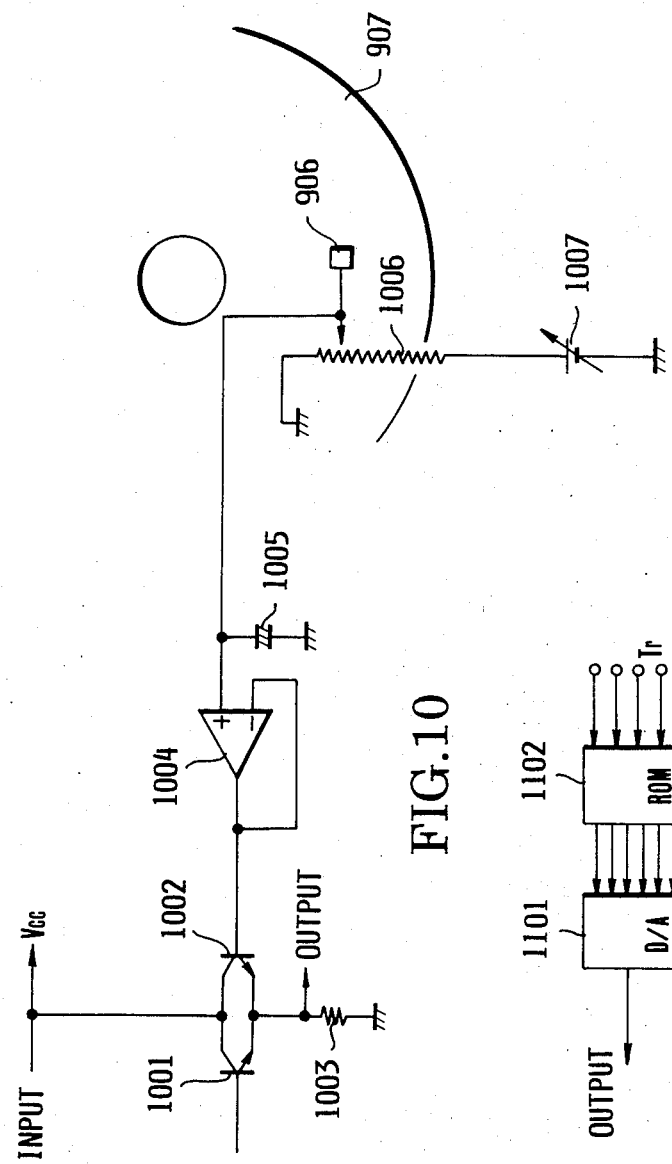
FIG. 10 is a circuit diagram showing a second embodiment of the present invention in which position information upon each recording track on a magnetic sheet is obtained using a potentiometer.
FIG. 11 is a schematic diagram showing the construction of a modification of the second embodiment shown in FIG. 9(b)

FIG. 10 is a schematic circuit diagram showing the construction of the recording system of the still video device according to a second embodiment of the present invention, the recording system being arranged to provide position information upon each recording track over the magnetic sheet by using a potentiometer such as that shown in FIG. 10.

In FIG. 10, like reference numerals are used to denote the like or corresponding elements used in the first embodiment shown in FIG. 9(a), and the detailed description thereof is omitted. For the sake of simplicity, the following description refers only to a process for setting the dark limit level.

As shown in FIG. 10, a potentiometer is indicated at 1006, and a variable DC voltage source 1007 is connected to one end of the potentiometer 1006. The resistance of the potentiometer 1006 is adapted to vary in association with the movement of the magnetic head 906 which is moved over the magnetic sheet 907 in the radial direction thereof by the head movement mechanism 905 of FIG. 9(a) in accordance with the instruction of the system controller 909. The potentiometer 1006 outputs a DC voltage signal which corresponds to the position of the magnetic head 906.

The DC voltage signal output from the potentiometer 1006 is supplied to the base of a transistor 1002 through an amplifier 1004 which serves as a buffer. The collector and emitter of the transistor 1002 are connected in common to those of a transistor 1001 to constitute a dark level limiter. The base of the transistor 1001 is supplied with a luminance signal which is emphasized by, and output from, the fixed emphasis circuit 901, and a signal whose dark level is suppressed to the dark limit level which is set in accordance with the potential of the DC voltage signal supplied to the base of the transistor 1002 is output to a white level limiter (not shown).

It is to be noted that the potential of the dc voltage signal supplied to the base of the transistor 1002 can be controlled by adjusting the resistance value of the potentiometer 1006 and the variable DC voltage source 1007, whereby an optimum dark limit level can be set by an optimum dark level limiter according to each specified track position. It is a matter of course that the white level limiter (not shown) can set a white limit level according to the output voltage of the potentiometer 1006 similarly to the above setting of the dark limit level.

If the dark limit level and the white limit level are to be set using the track specifying signal Tr as illustrated in the first embodiment, these limit levels can only be varied linearly For this reason, as shown in FIG. 11, a read-only memory (ROM) table 1102 may be connected to the input side of a D/A converter 1101 (corresponding to the D/A converter 910 of FIG. 9(b)). Addresses which correspond to individual track numbers are stored in the ROM table 1102, and data representing an arbitrary DC voltage is stored at each of the addresses. The system controller 909 outputs the track specifying signal Tr to specify the desired address of the ROM table 1102, thereby reading out the DC voltage data stored at the specified address. Then, this data is subjected to D/A conversion in the D/A converter 1101, and the obtained analog data is supplied to the dark level limiter or the white level limiter. With this arrangement, it becomes possible to obtain an arbitrary output from the D/A converter 1101 in accordance with the change of the track position by appropriately setting data stored in the ROM table 1102.

In the above-described arrangement, each of the dark level limiter and the white level limiter may be provided with a dedicated ROM table and a D/A converter so that DC voltage data can be read from each of the ROM tables in response to the track specifying signal Tr. With this arrangement, it becomes possible to achieve further fine setting of the respective limit levels of the dark level limiter and the white level limiter.

Also, if a signal recording apparatus is used to record luminance signals of various kinds which occupy different bands, a plurality of ROM tables corresponding to the kinds of luminance signals may be provided, and the ROM tables may be switched in accordance with the kind of a luminance signal to be recorded.

Figure 12:
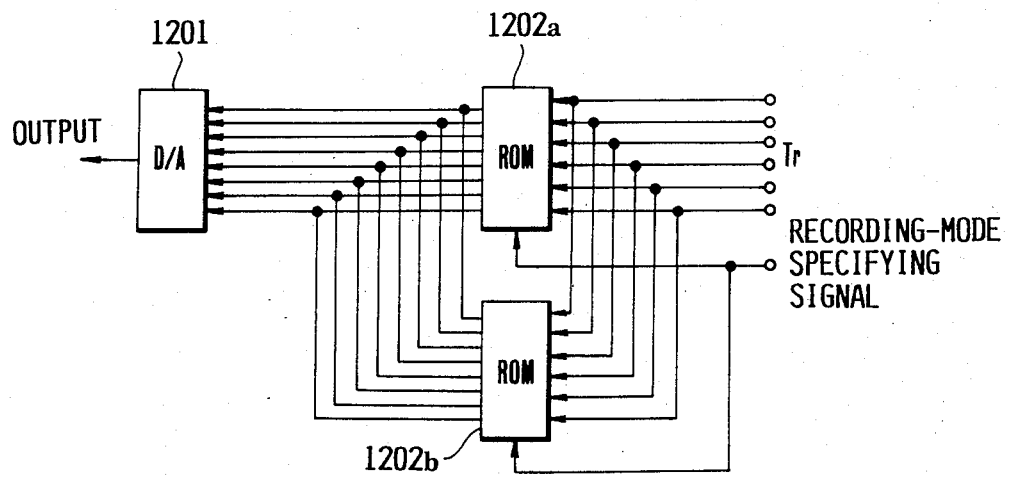
FIG. 12 is a schematic diagram of the construction of another modification of the second embodiment shown in FIG. 9(b), and shows an example of an arrangement for effecting switchover between ROM tables so as to record luminance signals of a plurality of kinds each occupying a different recording band.

FIG. 12 shows a construction for switching the ROM tables in the recording system of a still video device which is constructed, as described above, to record plural kinds of luminance signals which occupy different bands.

For the sake of simplicity, the following description refers to a case in which two kinds of recording modes (a HIGH mode and a LOW mode) are used. In HIGH mode, a signal is recorded after frequency-modulated into a signal which occupies a frequency band higher than a signal processed in LOW mode. However, the present invention is not limited solely to these two kinds. If it is desired to perform recording using more than two recording modes, the number of ROM tables may be increased and these ROMs may be switched in accordance with individual frequency bands.

Referring to FIG. 12, the track specifying signal Tr output from the system controller 909 of FIG. 9 is supplied to both a ROM table 1202a (for HIGH mode) and a ROM table 1202b (for LOW mode). Thus, output of the DC voltage data at the address specified by the track specifying signal Tr is enabled in each of these ROM tables. A recording mode specifying signal (H/L) which specifies a desired recording mode is supplied from the system controller 909 to each of the ROM tables 1202a and 1202b, and the ROM table which corresponds to the content of the recording mode specifying signal is selected. Then, as described previously, the DC voltage data stored at the address thus specified is output to the D/A converter 1201, and the limit levels of the dark level limiter and the white level limiter are set in accordance with the DC voltage output from the D/A converter 1201. A luminance signal thus limited is input to the following frequency modulator. The frequency modulator used in this arrangement is supplied with the recording mode specifying signal (H/L) which is input to the ROM tables 1202a and 1202b. If the recording mode specifying signal representing the HIGH mode is input, the frequency modulator effects frequency modulation using a high carrier frequency, while if the recording mode specifying signal representing the LOW mode is input, the frequency modulator effects frequency modulation using a low carrier frequency. The luminance signal which has been frequency-modulated in this fashion is recorded on the recording medium.

Figure 13:
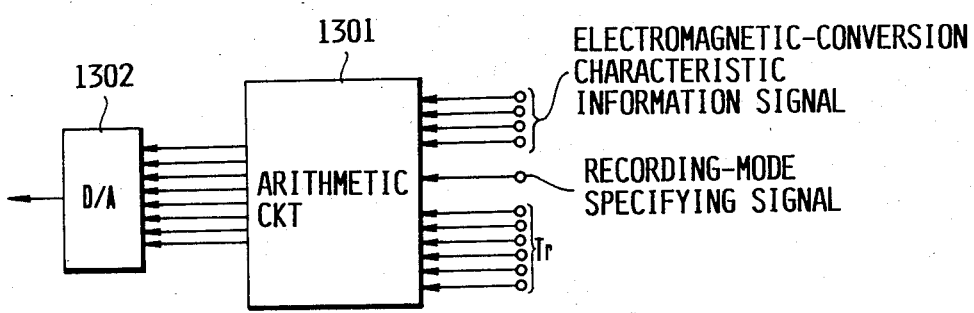
FIG. 13 is a schematic diagram showing the construction of still another modification of the second embodiment shown in FIG. 9(b)

If it is necessary to perform further fine setting of the limit levels of the limiters, the arrangement shown in FIG. 13 may be employed. As illustrated, an arithmetic circuit 1301 calculates DC voltage data for setting an optimum limit level by using an electromagnetic-characteristic information signal based on the electromagnetic-conversion characteristics of the recording medium, the aforesaid recording-mode specifying signal and the track specifying signal Tr. A D/A converter 1302 converts the obtained DC voltage data to an analog DC voltage signal and supplies it to the dark level limiter and the white level limiter so as to set the dark and white limit levels.

The above-described electromagnetic-characteristic information signal relative to the recording medium may preferably be constituted by data representing the level of a signal which is obtained by recording a signal of predetermined frequency and level on the recording medium by means of the magnetic head of the apparatus and reproducing the signal thus recorded.

Also, instead of the fact that the limit level is switched according to each track position, the amount or process of emphasis may be switched according to each track position. Such a case is described below as a third embodiment of the present invention.

It is known that non-linear emphasis is a process using a non-linear device (e.g., a diode, a transistor, etc.) in which its compression ratio at the time of a large-amplitude input differs from that at the time of a small-amplitude input. In such a non-linear emphasis process, when a signal of large amplitude is input, emphasis is effected on the signal so as to reduce the height of spike pulses which may occur at the leading edge portion of such a signal, but a signal of small amplitude is subjected to a large emphasis. Such a non-linear emphasis process, however, involves the following disadvantages. Since the non-linear emphasis utilizes the non-linear device described above, waveform matching is difficult to perform at the time of reproduction. Also, if the amount of emphasis is excessively increased, large noise occurs at the edge portions of the emphasized signal.

To overcome these disadvantages, the following arrangement may be used. That is, emphasis as close to fixed emphasis as possible is effected onto signals to be recorded on recording tracks at or near to the outer circumference of the recording medium on which inverted white peaks do not easily occur, while the amount of non-linear emphasis is increased with respect to signals to be recorded on recording tracks at or near to the inner circumference on which inverted white peaks easily occur.

Figure 14:
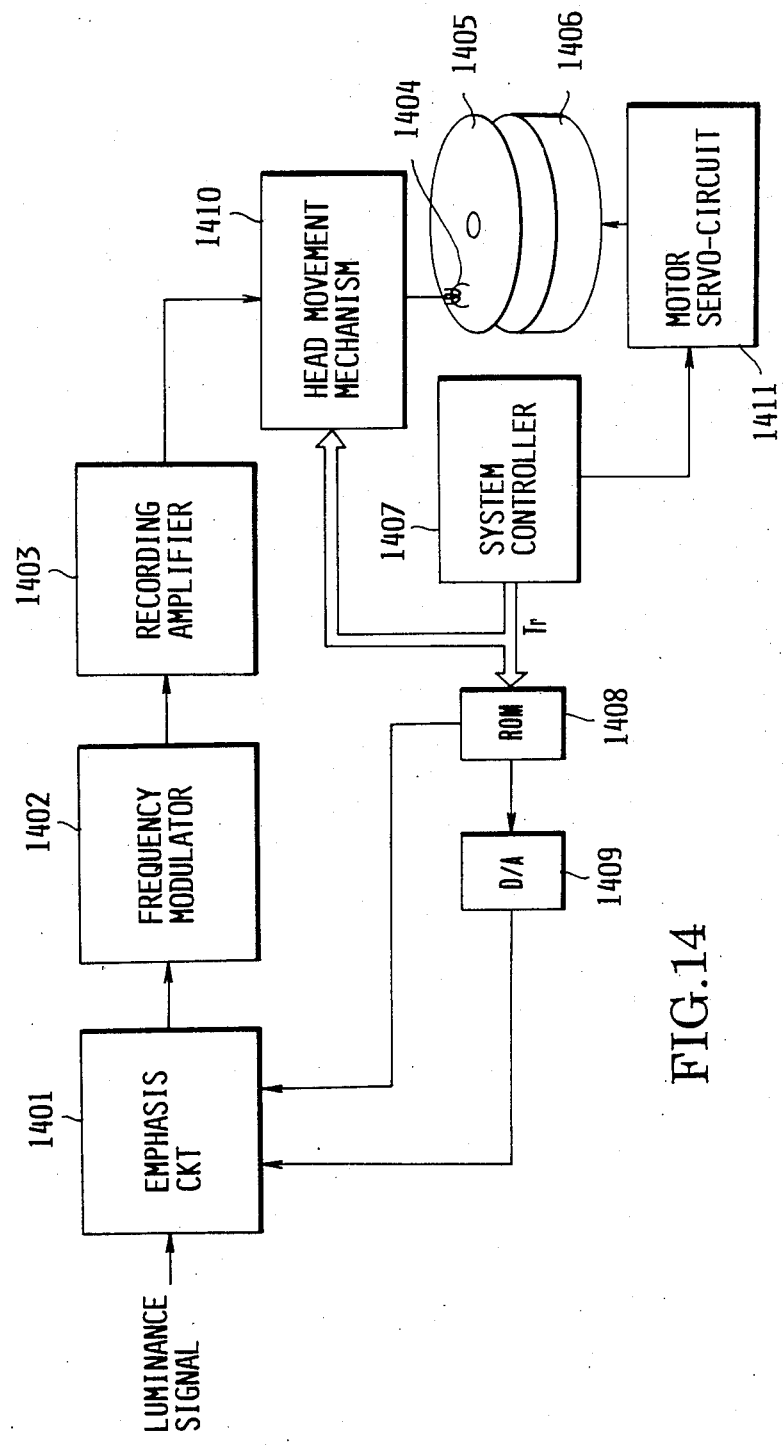
FIG. 14 is a block diagram of the construction of the recording system of a still video device to which a third embodiment of the present invention is applied.

FIG. 14 is a schematic block diagram of the recording system of a still video device according the third embodiment of the present invention, the recording system arranged to effect the above-described emphasis operation. As illustrated, an input luminance signal is subjected to an emphasis process (to be described later) in an emphasis circuit 1401, frequency-modulated by a frequency modulator 1402, amplified by a recording amplifier 1403, and recorded on a magnetic sheet 1405 by a magnetic head 1404 which can be moved by a head movement mechanism 1410. The magnetic sheet 1405 is rotated by a motor 1406 which runs at a predetermined rotational speed under the control of a motor servo-circuit 1411.

The operation of the motor 1406 is controlled by the motor servo-circuit 1411 which is activated by a motor operation start command signal output from a system controller 1407 prior to initiating recording, whereby the magnetic sheet 1405 is controlled to rotate at a predetermined rotational speed. The head movement mechanism 1410 is adapted to move the magnetic head 1404 to a desired track position on the magnetic sheet 1405, the desired track position being specified by the track position control signal Tr output from the system controller 1407.

The emphasis circuit 1401 of the third embodiment is arranged such that its emphasis characteristic can be varied through an external circuit. The construction of the emphasis circuit 1401 is as shown in FIG. 15.

Figure 15:
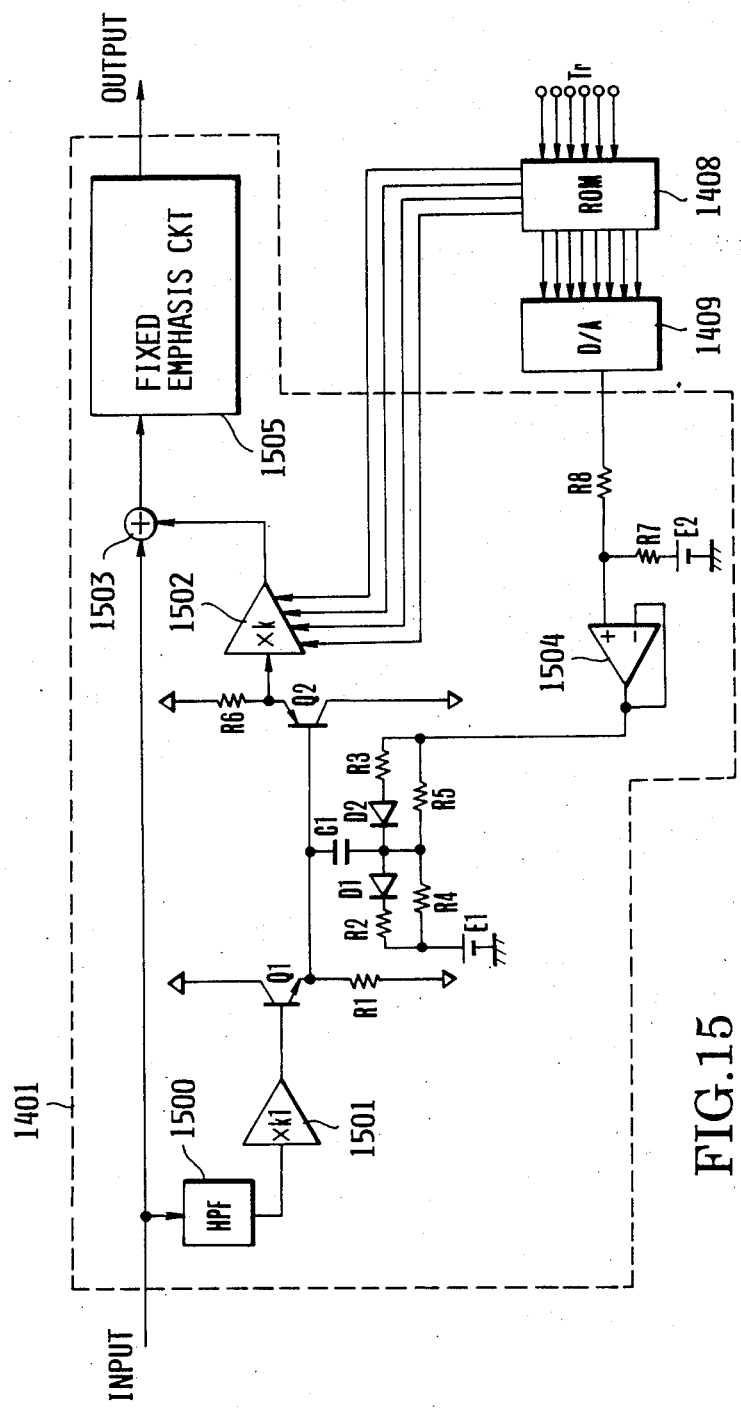
FIG. 15 is a circuit diagram showing an example of the construction of the emphasis circuit shown in FIG. 14.

The emphasis circuit 1401 shown diagrammatically in FIG. 15 includes the resistors R1 to R8, the transistors Q1, Q2, diodes D1, D2, the capacitor C1, DC power sources E1, E2, a high-pass filter (HPF) 1500, a factor multiplier 1501, an amplifier 1502 having switchable gains, a buffer amplifier 1504, and a fixed emphasis circuit 1505. The components in the interior of the emphasis circuit 1401 surrounded by a dashed line are combined to constitute a non-linear emphasis circuit. The non-linear emphasis circuit 1401 is capable of applying a proper amount of non-linear compression to an input signal through the diodes D1 and D2 in accordance with the level of the input signal. In this case, the degree of compression greatly depends on a bias current flowing in the diodes D1 and D2. For example, as the bias current increases, an input signal is compressed substantially uniformly irrespective of the level of an input signal. Conversely, as the bias current decreases, a small-level signal is substantially not compressed, and only a large-level signal is compressed.

Also, the amount of emphasis of the non-linear emphasis circuit 1401 can be varied by changing the gain of the amplifier 1502.

In the third embodiment, if a luminance signal is to be recorded on a recording track at or near to the outer circumference of the magnetic sheet 1405, the bias current flowing in the diodes D1 and D2 is increased to inhibit them from effecting the non-linear level compression described above and, further, the gain of the amplifier 1502 is decreased to enable the emphasis circuit 1401 to operates as a linear emphasis circuit. Conversely, if a luminance signal is to be recorded on a recording track at or near to the inner circumference of the magnetic sheet 1405, the bias current flowing the diodes D1 and D2 is decreased to allow them to effect the non-linear level compression and, further, the gain of the amplifier 1502 is increased to enable the emphasis circuit 1401 to operate as a non-linear emphasis circuit.

In order to vary the emphasis characteristic of the emphasis circuit 1401 in accordance with the position of each recording track on the magnetic sheet 1405, the emphasis circuit 1401 is supplied with both gain setting data for setting the gain of the amplifier 1502 and bias data for forming the bias current of the diodes D1 and D2 which corresponds to each recording track position on the magnetic sheet 1405. An address corresponding to each track position is assigned to each individual bias data and gain setting data, and a set of bias data and a set of gain setting data are stored in advance in the ROM table 1408. A desired address in the ROM table 1408 is specified by the track position specifying signal Tr output from the system controller 1407 and thus the bias data and the gain setting data stored at the specified address are read out.

The gain setting data is supplied directly to the amplifier 1502 of the emphasis circuit 1401 to set the gain of the amplifier 1502. The bias data is converted to a analog DC current signal by the D/A converter 1409 and then supplied to the diodes D1 and D2 through a bias current compensating circuit constituted by the resistors R7, R8, the DC power source E2 and the buffer amplifier 1504, thereby setting a desired level compression characteristic.

In the above-described manner, the emphasis characteristic of the emphasis circuit 1401 can be varied in accordance with each track position on the magnetic sheet 1405, whereby optimum recording can be performed.

Figure 16:
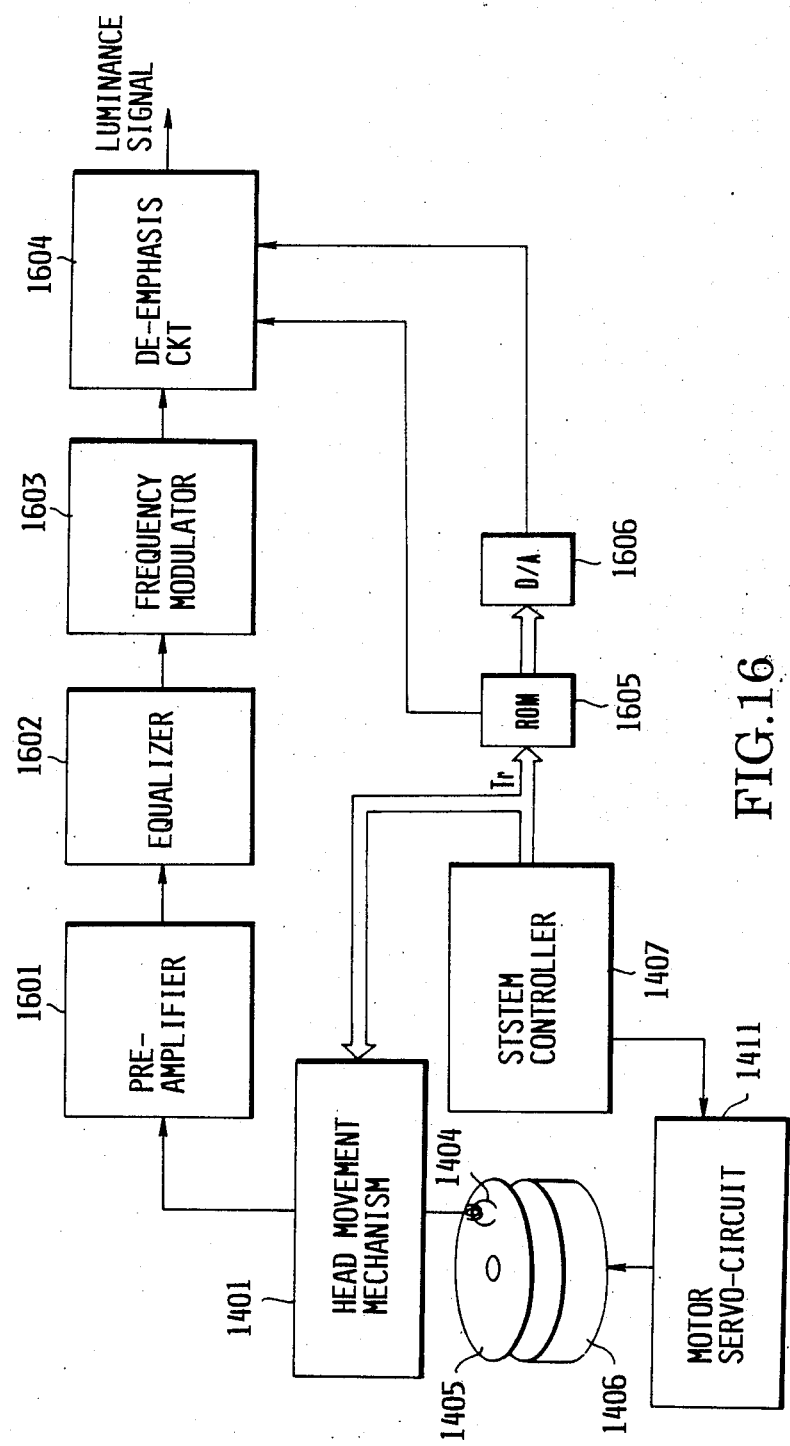
FIG. 16 is a block diagram showing the construction of a reproducing system corresponding to the recording system shown in FIG. 14.
Figure 17:
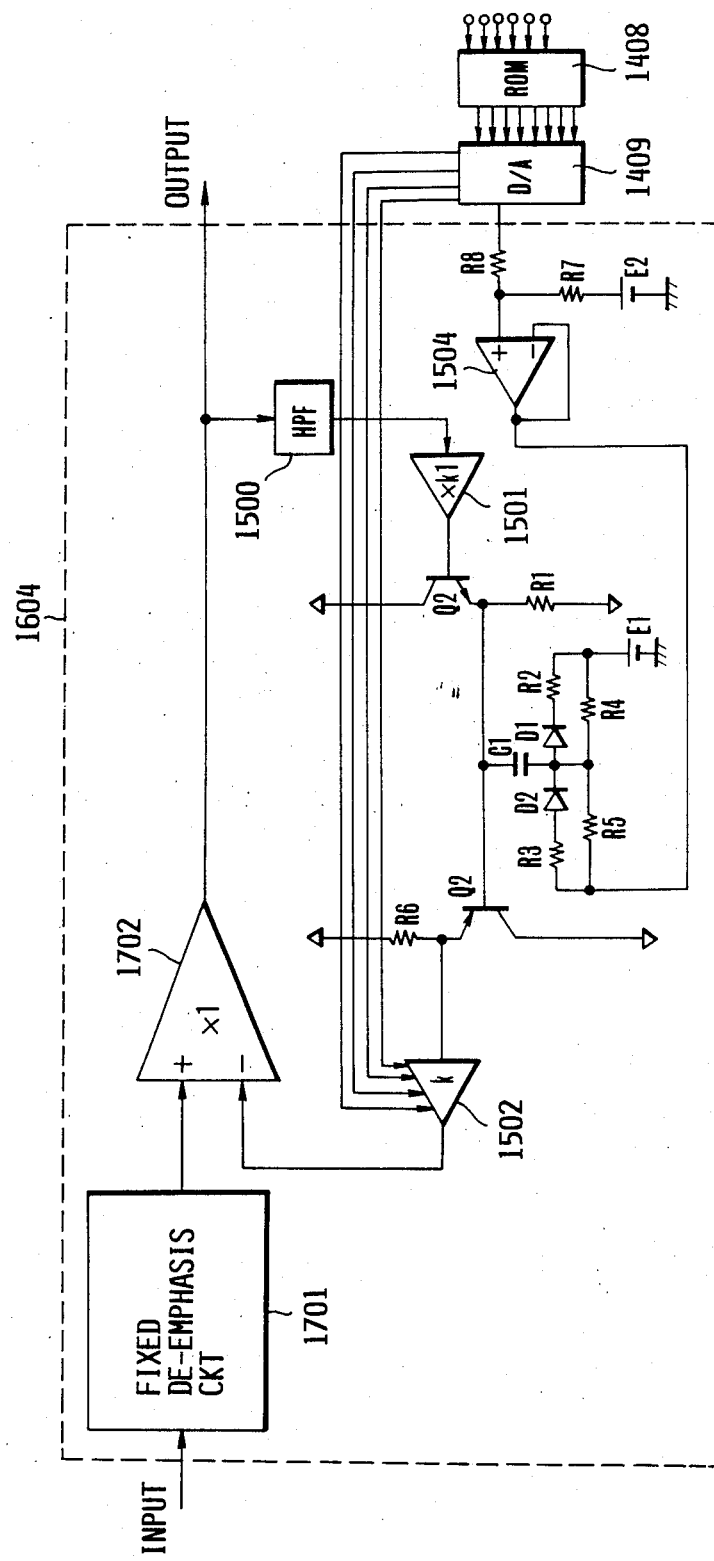
FIG. 17 is a circuit diagram showing an example of the construction of the de-emphasis circuit shown in FIG. 16.

FIGS. 16 and 17 diagrammatically show the construction of the reproducing system which corresponds to the recording system shown in FIGS. 14 and 15.

In FIG. 16, the same components as shown in FIG. 14 are identified by the same reference numerals, and the description thereof is omitted.

The reproducing system shown in FIG. 16, a signal recorded on the magnetic sheet 1405 is reproduced by the magnetic head 1404, amplified by the pre-amplifier 1601, equalized by an equalizer 1602, demodulated by a frequency demodulator 1603, and supplied to a de-emphasis circuit 1604. In the meantime, the system controller 1407 supplies the track position specifying signal Tr to a ROM table 1605 to switch the characteristics of the de-emphasis circuit 1604 in accordance with each track position on the basis of the gain data output from the ROM table 1605 and the bias current output from the D/A converter 1606.

FIG. 17 shows the construction of the de-emphasis circuit 1604.

As shown in FIG. 17, an input luminance signal is subjected to predetermined fixed de-emphasis by a fixed de-emphasis circuit 1701 and is, in turn, supplied to the plus input terminal of an amplifier 1702. The output of the amplifier 1702 is processed by the high-pass filter (HPF) 1500 and the succeeding circuitry similar to that of the above-described emphasis circuit 1401. The signal thus processed is fed back to the minus input terminal of the amplifier 1702. The signal is subjected to non-linear de-emphasis in the amplifier 1702 and is output therefrom as a reproduced luminance signal.

In the above-described manner, the luminance signal recorded by the recording system shown in FIG. 14 is reproduced and recovered by the reproducing system shown in FIG. 16.

Figure 18:
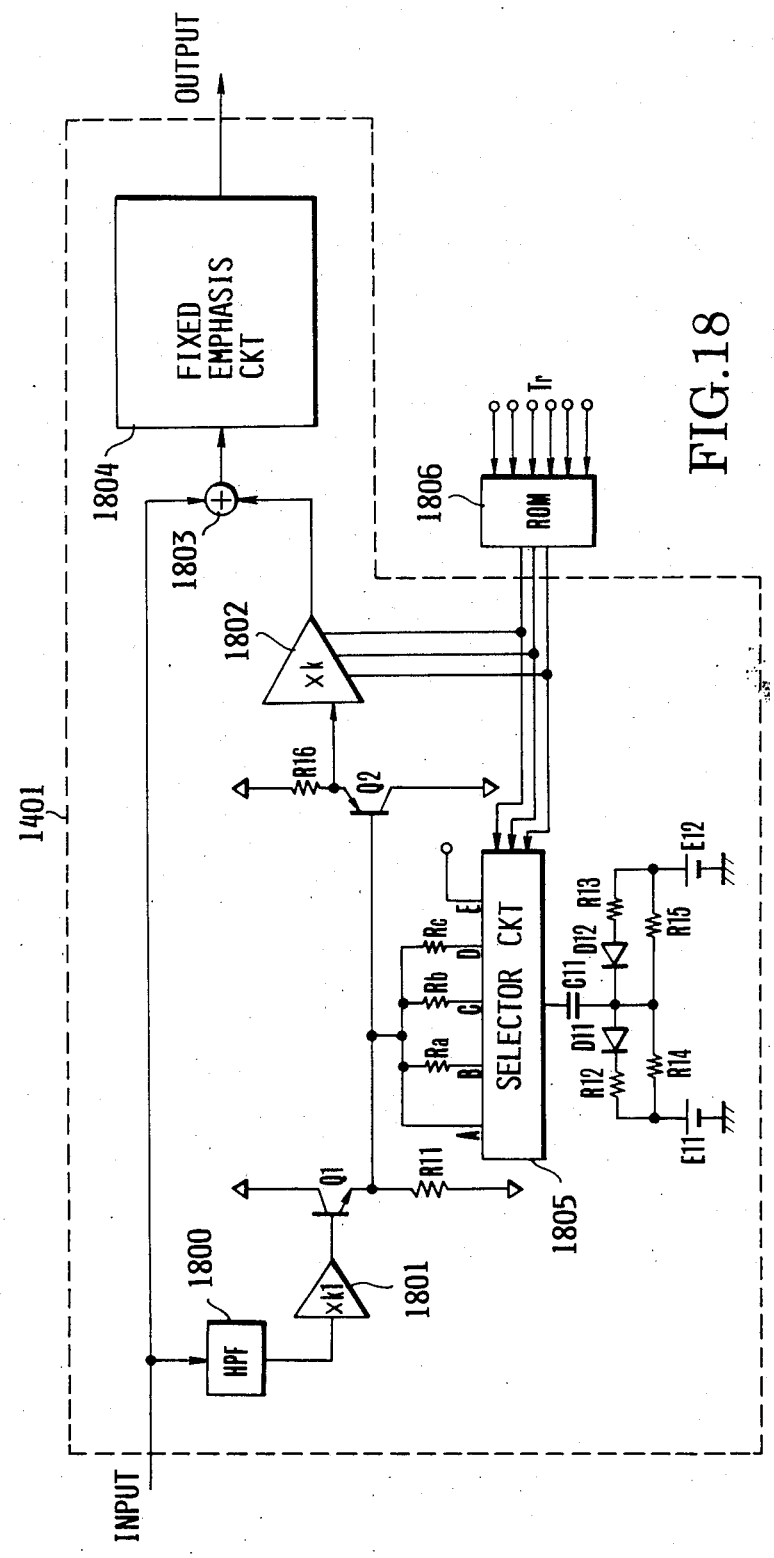
FIG. 18 is a circuit diagram of an emphasis circuit according to a fourth embodiment of the present invention.

FIG. 18 diagrammatically shows the construction of an emphasis circuit according to a fourth embodiment of the present invention, this embodiment being a modified version of the non-linear emphasis circuit 1401 of the third embodiment shown in FIG. 14.

The emphasis circuit shown in FIG. 18 is arranged so that the operation of its non-linear compression circuit can be inhibited or its compression effect can be reduced by a selecting operation according to each track position.

The emphasis circuit shown in FIG. 18 includes resistors R11 to R16, Ra, Rb and Rc, transistors Q11, Q12, diodes D11, D12, a capacitor C11, the DC power sources E1, E2, a high-pass filter (HPF) 1800, a factor multiplier 1801, an amplifier 1802 having switchable gains, a fixed emphasis circuit 1804, and a selector circuit 1805. In the illustrated emphasis circuit, the diodes D11 and D12 effect non-linear level compression in accordance with the level of an input signal. This emphasis circuit is further arranged such that the resistors Ra, Rb and Rc and the selector circuit 1805 can be used to cut off signals to be supplied to the diodes D11 and D12 or to reduce the levels of such signals, thereby selecting a desired non-linear compression characteristic. For example, the values of the resistors Ra, Rb and Rc connected between the transistor Q1 and the diode pair D11 and D12 are switched in accordance with a desired recording track position so that a non-linear compression characteristic according to the recording track position may be selected.

The following is a description of the selecting operation of the selector circuit 1805.

The selector circuit 1805 has five input terminals A to E. As illustratively shown in FIG. 18, the respective terminals B, C and D are supplied with signals passing through the resistors Ra, Rb and Rc, the terminal A is supplied with a signal which bypasses these resistors, and no signal is supplied to the terminal E.

The resistance values of the resistors Ra, Rb and Rc assume a relationship of Ra>Rb>Rc. As the resistance value is decreased, the amount of non-linear compression becomes large, while as the resistance value is increased, the amount of non-linear compression becomes small. In particular, if the selector circuit 1805 selects the input terminal E, the non-linear compression is not at all performed.

On the basis of selection data output from the ROM table 1806, it is determined which of the signals applied to the terminals A to E the selector circuit 1805 should be supplied to the diodes D11 and D12.

A set of selection data for selecting one from among the input terminals of the selector circuit 1805 is stored in the ROM table 1806 at addresses thereof which correspond to individual track positions specified by the track position specifying signals Tr output from the system controller 1407. When the track position specifying signal Tr which corresponds to a desired track position is supplied from the system controller 1407 to the ROM table 1806, corresponding selection data is read from the ROM table 1806 and then supplied to both the selector circuit 1805 and the amplifier 1802.

The selector circuit 1805 selects an appropriate one from among the input terminals A to E in accordance with the selection data supplied from the ROM table 1806, and supplies the signal provided at the selected input terminal to the diodes D11 and D12. More specifically, if the track position specifying signal Tr specifies a recording track at or near to the outer circumference of the magnetic sheet, the amount of non-linear compression is reduced. Conversely, if the signal Tr specifies a recording track at or near to the inner circumference, the amount of non-linear compression is increased. In particular, if the outermost recording track is specified, the input terminal E is selected to perform no non-linear compression.

The selection data output from the ROM table 1806 is also supplied to the amplifier 1802 so that the gain of the amplifier 1802 may be switched in accordance with the contents of the selection data. This gain switching is, for example, such that if the amount of non-linear compression is small, the gain of the amplifier 1802 is reduced, while if the amount of non-linear compression is large, the gain of the amplifier 1802 is increased.

With the above-described arrangement, it is possible to achieve effects equivalent to those of the construction shown in FIG. 14 by using a further simple arrangement.

Figure 19:
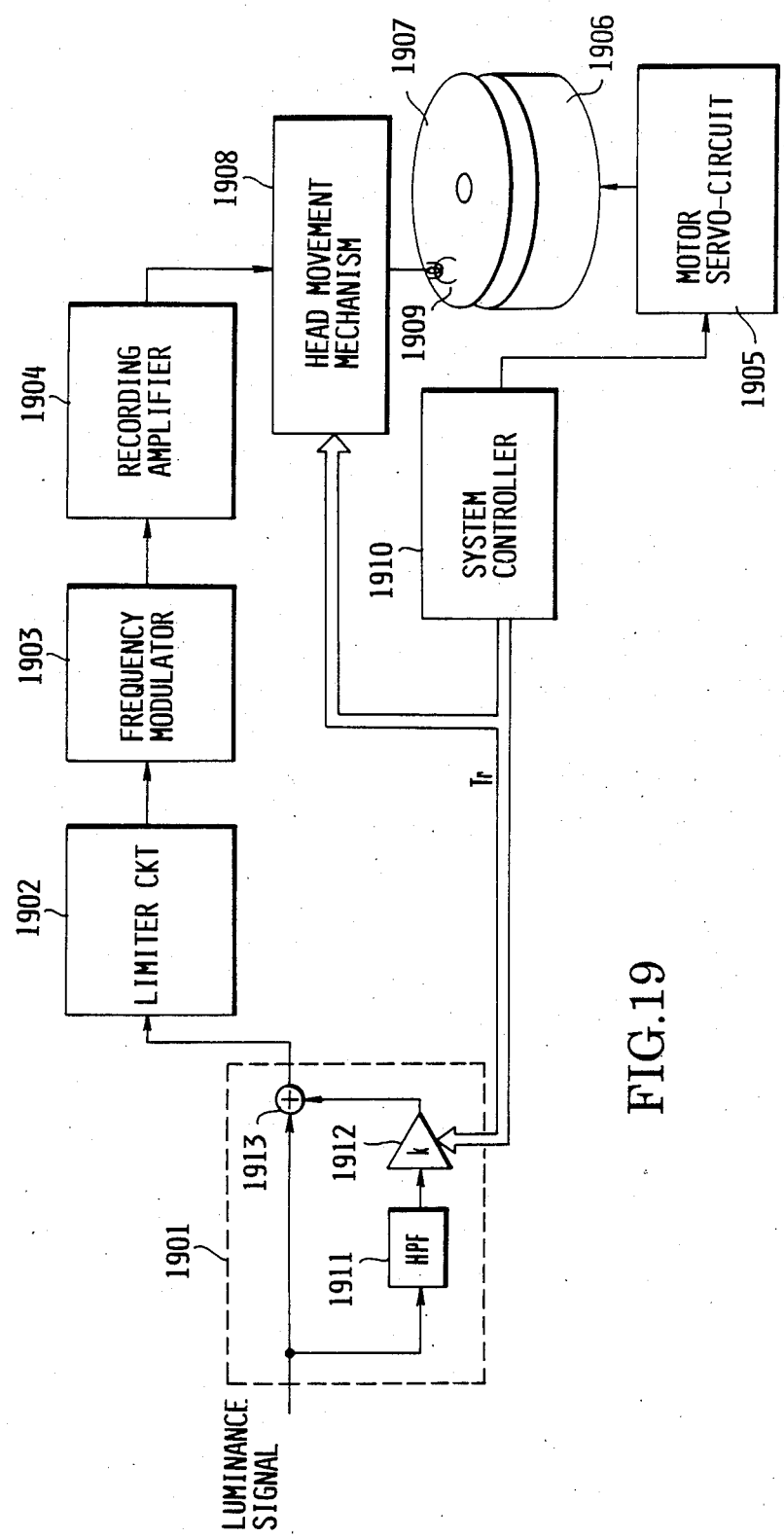
FIG. 19 is a block diagram showing the construction of a recording system according to a fifth embodiment of the present invention.
Figure 20:
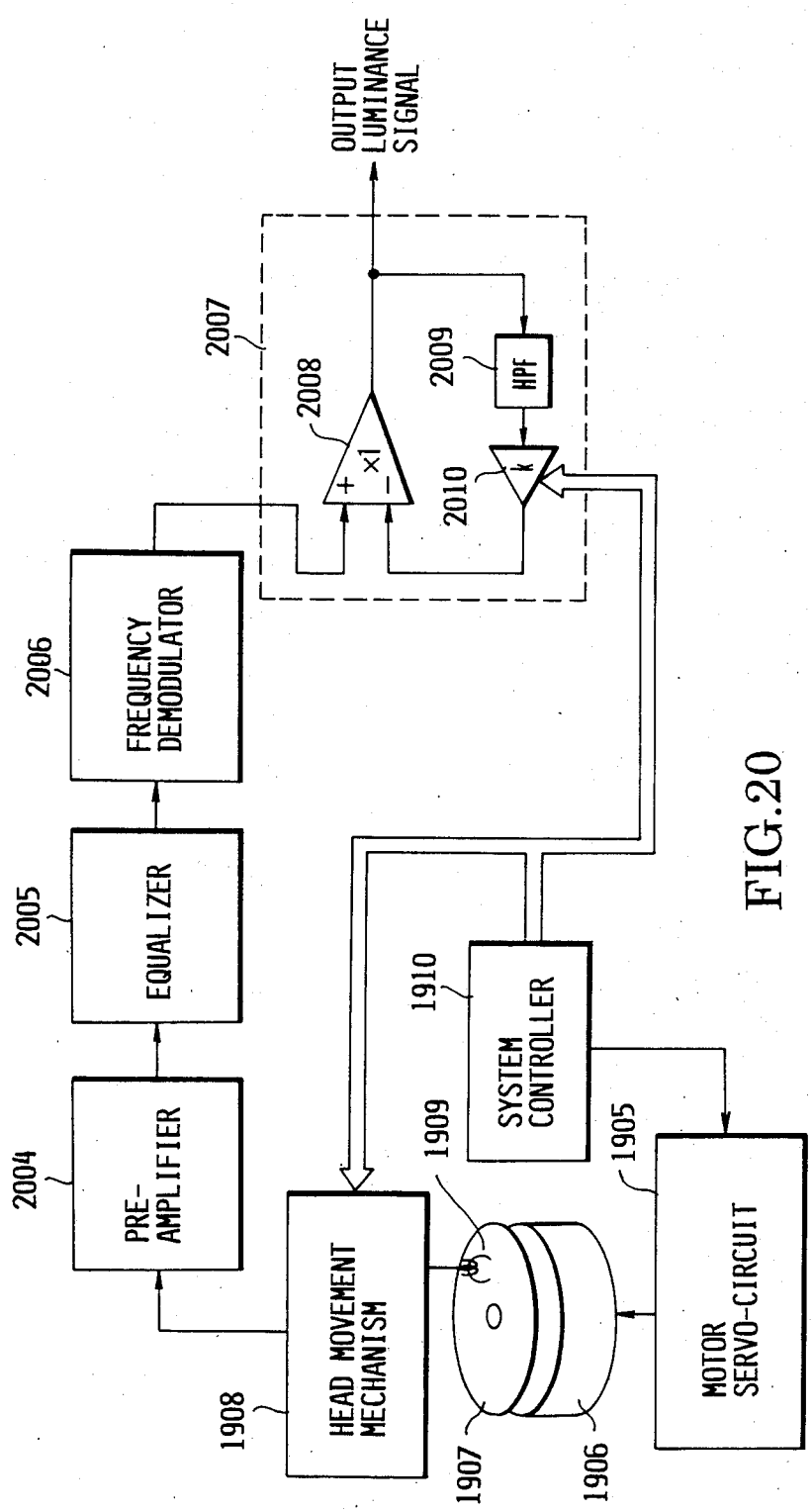
FIG. 20 is a block diagram showing the construction of a reproducing system corresponding to the recording system shown in FIG. 19.

FIGS. 19 and 20 diagrammatically show the construction of the recording and reproducing systems according to a fifth embodiment of the present invention, respectively.

Referring to FIG. 19 which shows the recording system, an input luminance signal is subjected to an emphasis process (to be described later) in an emphasis circuit 1901, and the level of the emphasized signal is suppressed, by a limiter circuit 1902, between dark and white limit levels which are both fixed. Thereafter, the signal is frequency-modulated by a frequency modulator 1903, amplified by a recording amplifier 1904, and recorded on a magnetic sheet 1907 by a magnetic head 1909 which can be moved by a head movement mechanism 1908. The magnetic sheet 1907 is rotated by a motor 1906 which runs at a predetermined rotational speed under the control of a motor servo-circuit 1905.

The operation of the motor 1906 is controlled by the motor servo-circuit 1905 which is activated by a motor operation start command signal output from a system controller 1910 prior to initiating recording, whereby the magnetic sheet 1907 is controlled to rotate at a predetermined rotational speed. The head movement mechanism 1908 is adapted to move the magnetic head 1909 to a desired track position on the magnetic sheet 1907, the desired track position being specified by the track position control signal Tr output from the system controller 1910.

As shown in FIG. 19, the emphasis circuit 1901 according to the fifth embodiment is constituted by a high-pass filter (HPF) 1911, a variable amplifier 1912, and an adder 1913. The variable amplifier 1912 is arranged such that its gain can be varied through an external circuit, and is adapted to effect emphasis on an input luminance signal by an emphasis amount corresponding to a recording track position specified by the track position specifying signal Tr output from the system controller 1910 by varying the gain of the variable amplifier 1912 in accordance with such a track position specifying signal Tr.

More specifically, when the system controller 1910 supplies to the variable amplifier 1912 the track position specifying signal Tr which specifies a recording track at or near to the outer circumference of the magnetic sheet 1907, the gain of the variable amplifier 1912 is reduced so that the amount of emphasis is reduced. This is because it is not necessary to increase the amount of emphasis since the S/N ratio of signals recorded on recording tracks at or near to the outer circumference is high. Conversely, if the track position specifying signal Tr which specifies a recording track at or near to the inner circumference is supplied to the variable amplifier 1912, the gain of the variable amplifier 1912 is increased and therefore the amount of emphasis is increased. This is because it is necessary to increase the amount of emphasis to enhance the S/N ratio since the S/N ratio is inferior on recording tracks at or near to the inner circumference.

As described above, it is possible to carry out optimum recording by varying the amount of emphasis of the emphasis circuit 1901 in accordance with the position of each recording track on the magnetic sheet 1907.

FIG. 20 diagrammatically shows the construction of the reproducing system which corresponds to the recording system shown in FIG. 19. In FIG. 20, the same components as shown in FIG. 19 are identified by the same reference numerals, and the description thereof is omitted.

The reproducing system shown in FIG. 20, a signal recorded on the magnetic sheet 1907 is reproduced by the magnetic head 1909, amplified by a pre-amplifier 2004, equalized by an equalizer 2005, demodulated by a frequency demodulator 2006, and supplied to a de-emphasis circuit 2007.

The de-emphasis circuit 2007 is a circuit which has the characteristics reverse to those of the emphasis circuit 1901 in the recording system shown in FIG. 19. As shown in FIG. 20, the de-emphasis circuit 2007 is constituted by an amplifier 2008 as well as a high-pass filter (HPF) 2009 and a variable amplifier 2010 which are respectively similar to the HPF 1911 and the variable amplifier 1912 in FIG. 1.

The operation of the de-emphasis circuit 2007 is described below. As shown in FIG. 19, a signal output from the frequency demodulator 2006 is supplied to the plus input terminal of the amplifier 2008. The high-band frequency components are separated from the output of the amplifier 2008 by the high-pass filter 2009 and then supplied to the variable amplifier 2010.

In the meantime, the variable amplifier 2010 is supplied with the track position specifying signal Tr from the system controller 1910, and the gain of the variable amplifier 2010 is set in accordance with the track position specifying signal Tr similarly to the variable amplifier 1912 in the aforesaid emphasis circuit 1901.

The signal amplified by the variable amplifier 2010 whose gain has been set as described above is fed back to the input terminal of the amplifier 2008. The signal which is thus de-emphasized is output as a reproduced luminance signal.

In the above-described manner, the luminance signal recorded by the recording system shown in FIG. 19 is reproduced and recovered by the reproducing system shown in FIG. 20.

With the information signal recording and reproducing apparatus according to each of the first to fifth embodiments described above, it is possible to optimally record information signals on a plurality of recording tracks, anywhere from the inner circumference to the outer circumference, which are concentrically formed on a disc-shaped recording medium without the risk of being influenced by noise or the like, and therefore to optimally reproduce signals recorded on the same.

A sixth embodiment of the present invention will be described below with reference to FIGS. 21 through 25.

Figure 21:
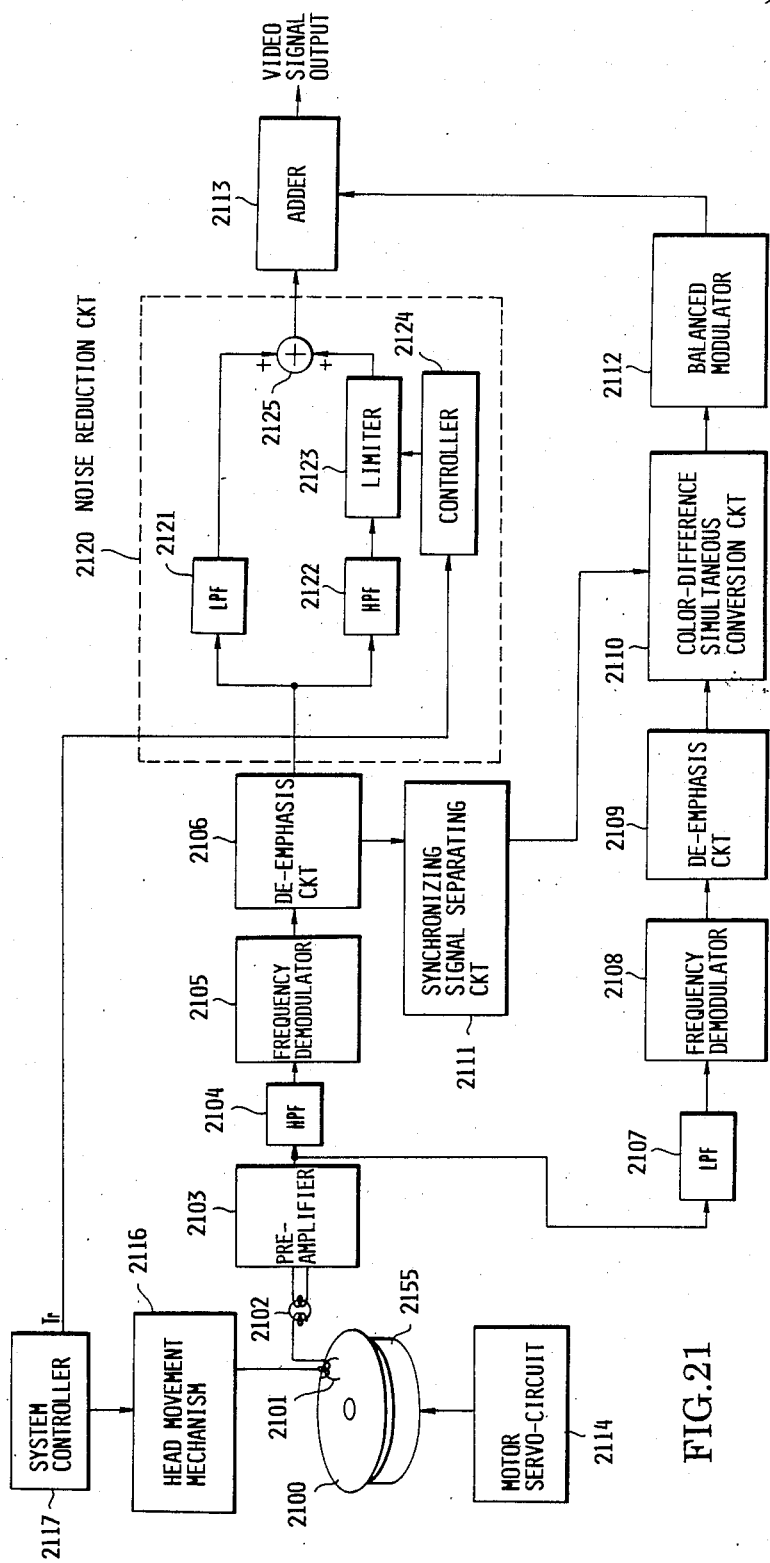
FIG. 21 is a block diagram showing an example of the construction of the entire circuit of a still video device to which a sixth embodiment of the present invention is applied.

FIG. 21 diagrammatically shows the construction of the reproduction system of a still video device according to the sixth embodiment of the present invention. As illustrated, a disc-shaped recording medium 2100 such as a magnetic disc or an optical disc is caused to rotate by a motor 2115, and the motor 2115 operates under the control of a motor servo-circuit 2114. A head 2101 is provided for reproducing recorded signals such as video signals recorded on the recording medium 2100. The head 2101 is caused to move by a head movement mechanism 2116 under the control of a system controller 2117. Also, the system controller 2117 is adapted to detect track numbers designated on the recording medium 2100 and output the position information of the detected track number as information representing the position of the head 2101.

A pre-amplifier 2103 is connected to the head 2101 through a transformer 2102. The reproduced signal output from the pre-amplifier 2103 is supplied to a high-pass filter (HPF) 2104 and a low-pass filter (LPF) 2107. The output of the high-pass filter 2104 is connected to the input of a frequency demodulator 2105 the output of which is connected to the input of a de-emphasis circuit 2106. As is known, the de-emphasis circuit 2106 has the characteristics reverse to those of the pre-emphasis circuit of a recording device (not shown). The output of the low-pass filter 2107 is connected to the input of a frequency demodulator 2108 the output of which is connected to the input of a de-emphasis circuit 2109. The output of the de-emphasis circuit 2109 is connected to a corresponding input of a color-difference simultaneous conversion circuit 2110 the output of which is, in turn, connected to the input of a balanced modulator 2112. A synchronizing signal separating circuit 2111 is connected to the other input of the color-difference simultaneous conversion circuit 2110. The synchronizing signal separating circuit 2111 separates a synchronizing signal from each signal provided by the de-emphasis circuit 2106 and supplies the synchronizing signal to the color-difference simultaneous conversion circuit 2110.

The other output of the de-emphasis circuit 2106 is connected to a noise reduction circuit 2120 for effecting noise reduction according to the sixth embodiment of the present invention. The noise reduction circuit 2120 includes basic circuits such as a low-pass filter 2121, a high-pass filter 2122, a limiter 2123 and an adder 2125 as well as a controller 2124. The controller 2124 is adapted to continuously vary the noise slicing level of the limiter 2123 on the basis of the track specifying signal Tr representative of a track position (or track number) which is supplied from the aforesaid system controller 2117. More specifically, the controller 2124 determines such a noise slicing level so that the effect of slicing may become higher from the outer circumference toward the inner circumference. The outputs of the noise reduction circuit 2120 and the balanced modulator 2112 are connected to the corresponding inputs of an adder 2113. The adder 2113 synthesizes these outputs, and outputs a reproduced video signal.

The following is a description of the operation of the sixth embodiment shown in FIG. 21.

In the above-described arrangement, the signal read from the recording medium 2100 by the head 2101 is supplied via the amplifier 2103 to the high-pass filter 2104 and the low-pass filter 2107.

After separation by the low-pass filter 2107, the resulting frequency-modulated color-difference line-sequential signal is supplied to the frequency demodulator 2108. The demodulated signal is applied to the de-emphasis circuit 2109 and thus the color-difference line-sequential signal of the desired baseband is provided. This color-difference line-sequential signal is subjected to a known color-difference simultaneous conversion process in the color-difference simultaneous conversion circuit 2110, followed by balanced modulation at 3.58MHz (color subcarrier frequency) in the balanced modulator 2112. The thus-obtained signal is applied to the adder 2113, in which this signal is synthesized with a luminance signal which has been subjected to noise reduction in the noise reduction circuit 2120. Thus, the resultant composite video signal is output from the adder 2113.

The luminance signal is separated by the high-pass filter 2104 from the signal supplied from the pre-amplifier 2103, demodulated by the frequency demodulator 2105, and applied to the de-emphasis circuit 2106. The de-emphasis circuit 2106 effects de-emphasis on the applied signal, the de-emphasis having the characteristics reverse to those of the emphasis process which has been effected during recording. The output signal of the de-emphasis circuit 2106 is subjected to noise reduction in the noise reduction circuit 2120 and then supplied to the adder 2113. The adder 2113 adds the supplied signal to the above-described color signal which has passed through balanced modulation, thereby outputting the composite video signal.

In the noise reduction circuit 2120, as described above, the limiter 2123 is placed under the control of the controller 2124. The controller 2124 is supplied with the track specifying signal Tr from the system controller 2117 and, on the basis of the track specifying signal Tr, the controller 2124 determines the noise slicing level as described above. In this case, the C/N ratio differs at each track position and therefore the S/N ratio also differs at each track position. Accordingly, if a suitable slicing level of the limiter 2123 is determined in accordance with information representing each track position, it is possible to set an appropriate amount of noise reduction.

Figure 22:
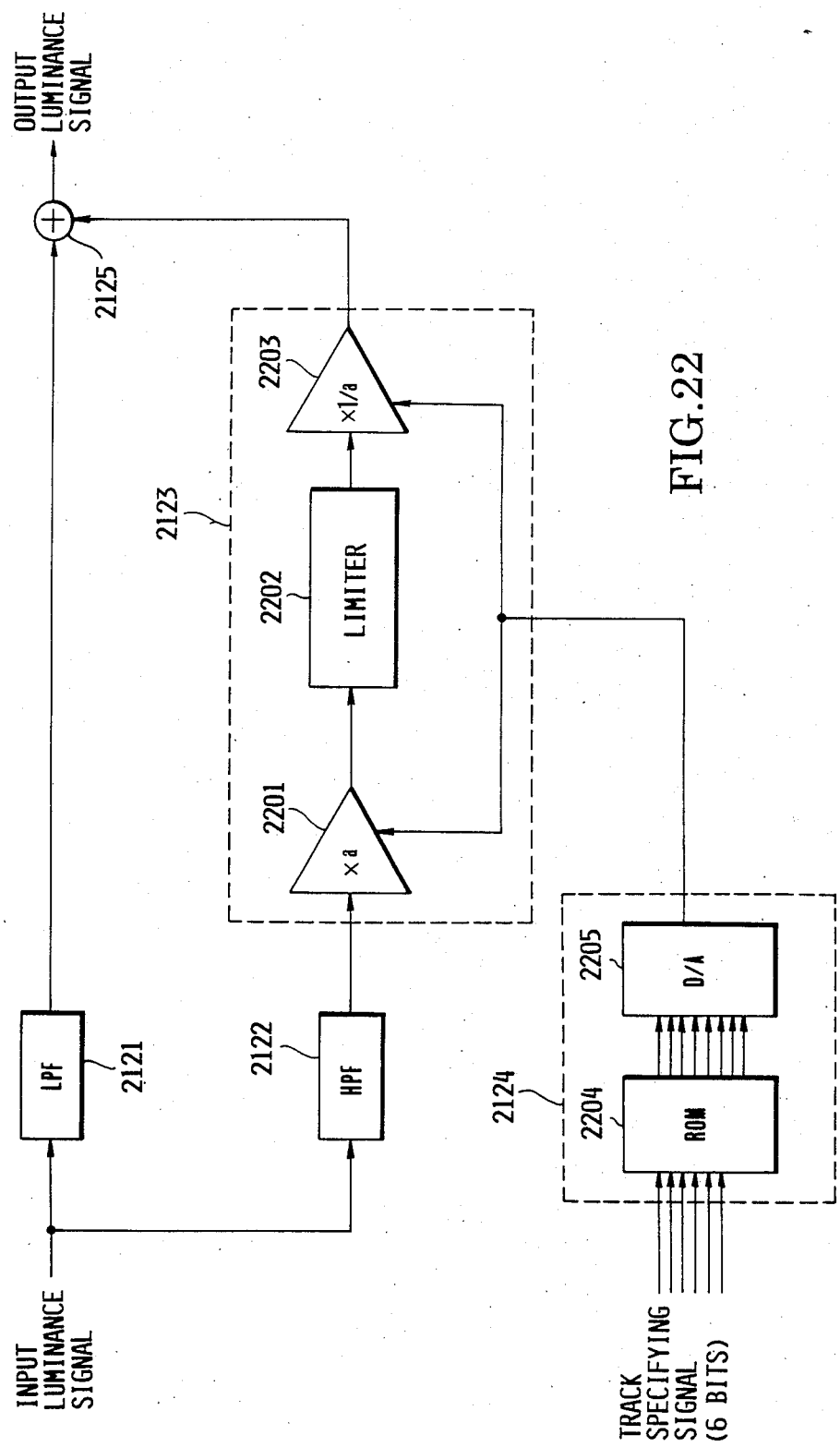
FIG. 22 is a detailed block diagram showing an example of the construction of the noise reduction circuit shown in FIG. 21.

In addition, the above-described noise reduction circuit will be described in detail with reference to FIG. 22.

Since it is necessary for the track specifying signal Tr output from the system controller 2117 to specify a maximum of fifty tracks, the track specifying signal Tr is represented by 6-bit data. Such a track specifying signal Tr is input to a ROM (read-only memory) 2204. The ROM 2204 is provided with a memory table in order to convert the amplification ratio a of each gain controller amplifier 2201 and 2203 into an amplification ratio corresponding to the input track specifying signal Tr, whereby the amplification ratio a may assume an optimum value at each track position.

In the sixth embodiment, the ROM 2204 outputs 8-bit data. The output data of the ROM 2204 is subjected to analog-to-digital conversion in a digital-to-analog (D/A) converter 2205. The amplification ratio a of each of the gain control amplifier 2201 and 2203 is controlled by the DC voltage output from the D/A converter 2205, thereby equivalently controlling the slicing level of a limiter 2202. As a matter of course, a silicon diode may be used as a slicing circuit. In this case, the data contained in the memory table of the ROM 2204 may be converted into data relative to a bias current in accordance with the input track specifying signal Tr, and the bias current may be controlled in accordance with data output from the ROM 2204 to vary the slicing level.

Figure 23:
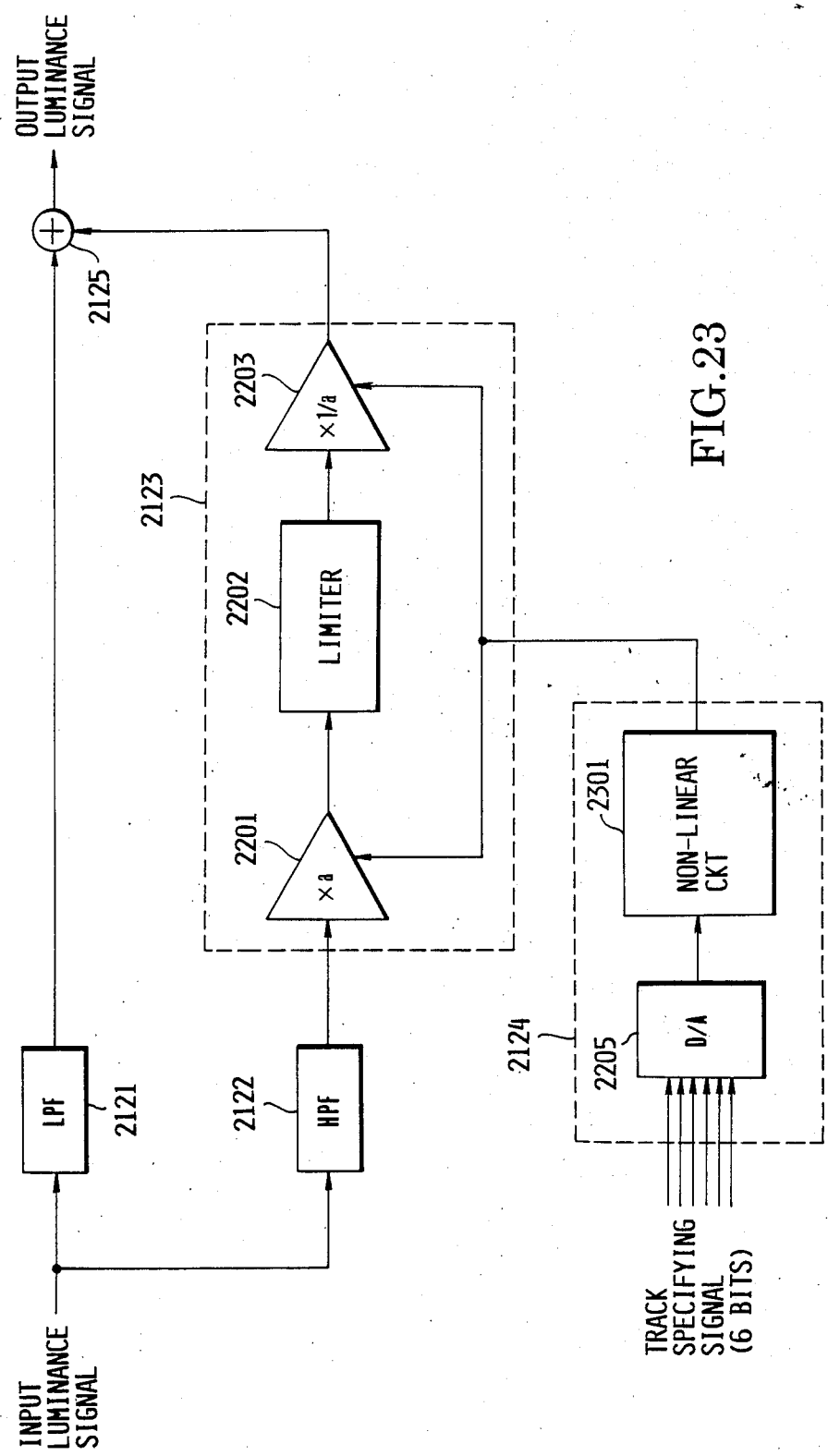
FIGS. 23, 24 and 25 are block diagrams respectively showing noise reduction circuits according to modifications of the sixth embodiment.

FIG. 23 is a circuit diagram diagrammatically showing a modified form of the sixth embodiment of the noise reduction circuit according to the present invention. As illustrated, a non-linear circuit 2301 is used in place of the ROM 2204 shown in FIG. 22. In this modified form, the 6-bit track specifying signal Tr is converted into an analog level signal by the D/A converter 2205 and the non-linear circuit 2301 controls the amplification ratio a of each of the gain control amplifiers 2201 and 2203 in an analog manner in accordance with the level of the level signal.

Figure 1A:
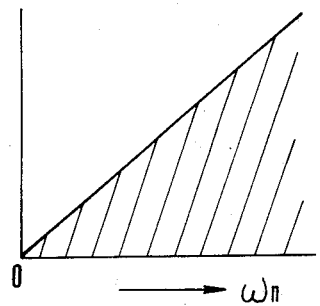
FIG. 1(a) is a graphic representation showing a typical example of the spectrum of noise components after frequency modulation and demodulation.
Figure 1B:
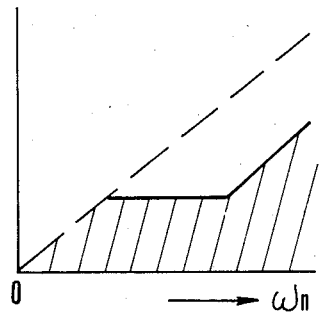
FIG. 1(b) is a graphic representation showing a typical example of the spectrum of the noise components after emphasis and de-emphasis.
Figure 24:
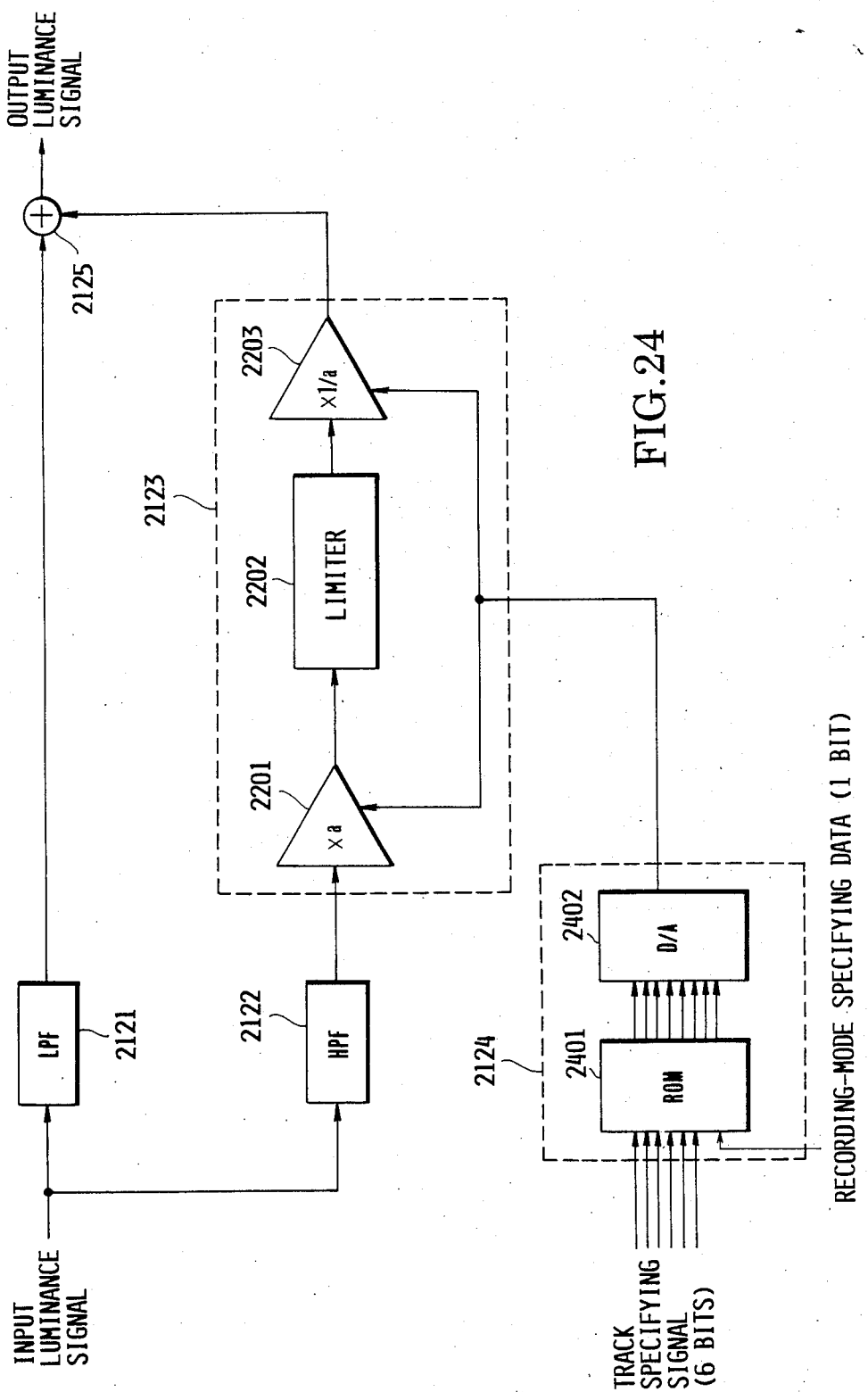

Also, if a plurality of recording modes for recording video signals on the recording medium 2100 are available, for example if there is a high-band recording mode for recording video signals after frequency-modulating them with a carrier signal of higher frequency than a carrier frequency which is normally used, as shown in FIG. 24 1-bit recording-mode-specifying data representing "0" is supplied to the input of the ROM 2401 when the high-band recording mode is selected but, when the high-band recording mode is not selected, 1-bit recording mode specifying data representing "1" is supplied to the same. Thus, the slicing characteristic may be varied in accordance with whether the 1-bit data represents "0" or "1".

Figure 25:
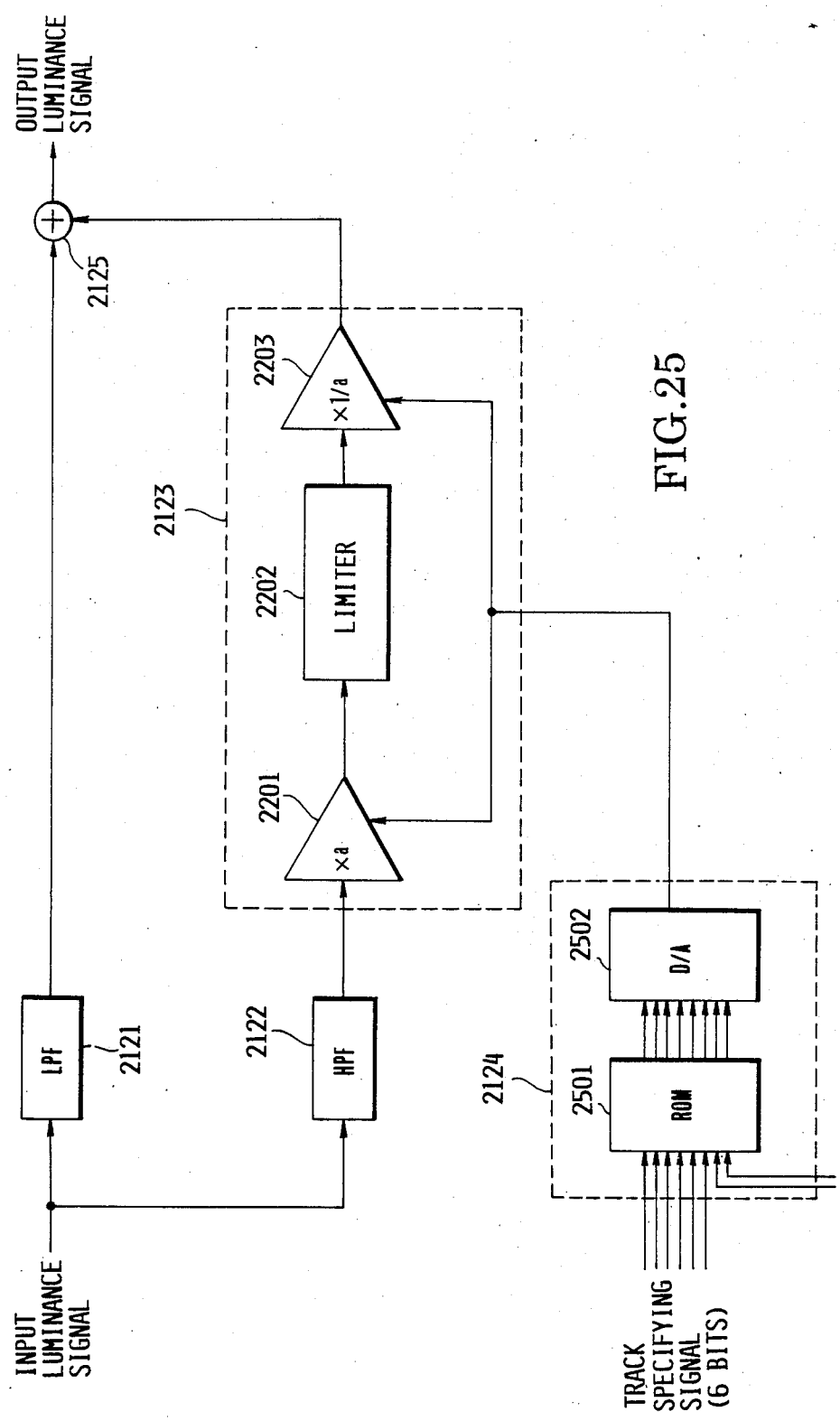

Furthermore, if a user desires to change the characteristic of the noise reduction "at will", for example in four steps, as shown in FIG. 25, 2-bit data for adjustment of such a characteristic may be applied to the input of a ROM 2501 to vary the slicing characteristic in accordance with the characteristic adjustment date.

The present invention is basically applicable to any form of noise reduction circuit that employs a slicing circuit. In each of the above-described embodiments, an addition type of noise reduction circuit is used for the purpose of illustration, but if a subtraction type of noise reduction circuit is employed, it is of course possible to achieve identical effects.

It will be appreciated from the foregoing that, in accordance with the present invention, since the amount of noise reduction is continuously controlled on the basis of each track position information, it is possible to implement optimum noise reduction without any oversufficiency nor insufficiency at each track position when information recorded on the disc-shaped recording medium is to be reproduced. Accordingly, since it is possible to effect noise reduction to a limit beyond which distortion due to such noise reduction is visually perceived, the S/N ratio can be enhanced to a great extent.

What is claimed is:

1. An information signal recording apparatus arranged to concentrically form a plurality of recording tracks on a disc-shaped recording medium by recording information signals on said disc-shaped recording medium, comprising:
    (a) linear emphasis means arranged to receive an information signal and then to linearly emphasize a predetermined high-band frequency component of said input information signal;
    (b) angle modulation means for forming and outputting an angle-modulated information signal by angle-modulating said information signal whose predetermined high-band frequency component has been linearly emphasized by, and supplied from said linear emphasis means;
    (c) recording head means arranged to receive said angle-modulated information signal output from said angle modulation means and then to record said angle-modulated information signal on said disc-shaped recording medium;
    (d) head movement means for causing said recording heads means to move over said disc-shaped recording medium in the radial direction thereof;
    (e) head-position-specifying signal output means for outputting a head-position specifying signal to said head movement means so as to cause said recording head means to move to an arbitrary position in the radial direction of said disc-shaped recording medium;
    (f) DC-level signal output means arranged to receive as an input said head-position-specifying signal output from said head-position-specifying signal output means and then to output a DC-level signal corresponding to said input head-position-specifying signal; and
    (g) variable level limiting means for limiting the level of said information signal having said predetermined high-band frequency component linearly emphasized by said linear emphasis means, in accordance with said DC-level signal outputted from said DC-level signal output means.

2. An information signal recording apparatus according to claim 1, wherein said variable level limiting means includes limiter means for limiting, in accordance with said DC-level signal output from said DC-level signal output means, the level of said information signal having said predetermined high-band frequency component emphasized by said linear emphasis means.

3. An information signal recording apparatus according to claim 1, wherein said DC-level signal output means includes arithmetic means for performing arithmetic operations upon DC-level data for using the head-position specifying signal output from said head-position-specifying signal output means.

4. An information signal recording apparatus according to claim 1, wherein said DC-level signal output means includes memory means which stores DC-level data corresponding to the head-position specifying signal output from aid head-position-specifying signal output means, said memory means being arranged to output the DC-level data corresponding to the input heat-position specifying signal.

5. An information signal recording apparatus according to claim 4, wherein said memory means includes:
  (A) a first memory circuit in which is stored first DC-level data corresponding to said head-position specifying signal output from said head-position-specifying signal output means; and
  (b) a second memory circuit in which second DC-level data is stored, said second DC-level data being at least partially different from said first DC-level data.

6. An information signal recording apparatus arranged to concentrically form a plurality of recording tracks on a disc-shaped recording medium by recording information signals on said disc-shaped recording medium, comprising:
  (a) non-linear emphasis means arranged to receive an information signal and then to non-linearly emphasize a predetermined high-band frequency component of said input information signal;
  (b) angle modulation means for forming and outputting an angle-modulated information signal by angle-modulating said information signal whose predetermined high-band frequency component has been non-linearly emphasized by, and supplied from, said non-linear emphasis means;
  (c) recording head means arranged to receive said angle-modulated information signal output from said angle modulation means and then to record said angle-modulated information signal on said disc-shaped recording medium;
  (d) head movement means for causing said recording head means to move over said disc-shaped recording medium in the radial direction thereof;
  (e) head-position-specifying signal output means for outputting a head-position-specifying signal to said head movement means so as to cause said recording head means to move to an arbitrary position in the radial direction of said disc-shaped recording medium;
  (f) DC-level signal output means arranged to receive as an input said head-position-specifying signal output from said head-position-specifying signal output means and then to output a DC-level signal corresponding to said input head-position-specifying signal; and
  (g) variable level limiting means for limiting the level of said information signal having said predetermined high-band frequency component non-linearly emphasized by said non-linear emphasis means, in accordance with said DC-level signal outputted from said DC-level signal output means.

7. An information signal recording apparatus according to claim 6, wherein said non-linear emphasis means includes a non-linear emphasis circuit for non-linearly emphasizing predetermined high-band frequency component of said input information signal in accordance with said DC-level signal output from said DC-level signal output means.

8. An information signal recording apparatus according to claim 6, wherein said DC-level signal output means includes arithmetic means for performing arithmetic operations upon DC-level data by using the head-position specifying signal output from said head-position-specifying signal output means.

9. An information signal recording apparatus according to claim 6, wherein said DC-level signal output means includes memory means which stores DC-level data corresponding to the head-position specifying signal output from said head-position-specifying signal output means, said memory means being arranged to output the DC-level data corresponding to the input head-position specifying signal.

10. An information signal recording apparatus according to claim 9, wherein said memory means includes:
  (a) a first memory circuit in which is stored first DC-level data corresponding to the head-position specifying signal output from said head-position-specifying signal output means; and
  (b) a second memory circuit in which second DC-level data is stored, said second DC-level data being at least partially different from said first DC-level data.

11. An information signal reproducing apparatus arranged to reproduce information signals from a disc-shaped recording medium, a plurality of recording tracks being concentrically formed over said disc-shaped recording medium by recording said information signals thereon, comprising:
  (a) reproducing head means arranged to trace a portion of said plurality of recording tracks formed over said disc-shaped recording medium and then to reproduce an information signal recorded on the traced recording track;
  (b) head movement means for causing said reproducing head means to move to an arbitrary position thereof in the radial direction of said disc-shaped recording medium;
  (c) head-position-specifying signal output means for outputting a head-position-specifying signal to said head movement means so as to cause said reproducing head means to move to an arbitrary position in the radial direction of said disc-shaped recording medium;
  (d) non-linear de-emphasis means arranged to receive the information signal reproduced by said reproducing head means and then to non-linearly suppress a predetermined high-band frequency component of said input information signal;
  (e) control means including DC-level signal output means arranged to receive said head-position-specifying signal output from said head-position-specifying signal output means then to output a DC-level signal corresponding to said input head-position specifying signal, said control means being arranged to control the amount of non-linear suppression which is effected by said non-linear de-emphasis means with respect to the predetermined high-band frequency component of said information signal, in accordance with said DC-level signal outputted from said DC-level signal output means.

12. An information signal reproducing apparatus according to claim 11, wherein said non-linear de-emphasis means includes a non-linear de-emphasis circuit arranged to receive the information signal reproduced by said reproduction head means and then to non-linearly suppress a predetermined high-frequency component of said input information signal in accordance with the DC-level signal output from said DC-level signal output means.

13. An information signal reproducing apparatus according to claim 11, wherein said DC-level signal output means includes arithmetic means for performing arithmetic operations upon DC-level data by using the head-position specifying signal output from said head-position-specifying signal output means.

14. An information signal reproducing apparatus according to claim 11, wherein said DC-level signal output means includes memory means which stores DC-level data corresponding to the head-position specifying signal output from said head-position-specifying signal output means, said memory means being arranged to output DC-level data corresponding to the input head-position specifying signal.

15. An information signal reproducing apparatus according to claim 14, wherein said memory means includes:
   (a) a first memory circuit in which is stored first DC-level data corresponding to the head-position specifying signal output from said head-position-specifying signal output means; and
   (b) a second memory circuit in which second DC-level data is stored, said second DC-level data being at least partially different from said first DC-level data.

16. An information signal reproducing apparatus arranged to reproduce information signals from a disc-shaped recording medium, a plurality of recording tracks being concentrically formed over said disc-shaped recording medium by recording said information signals thereon, comprising:
   (a) reproducing head means arranged to trace a portion of said plurality of recording tracks formed over said disc-shaped recording medium and then to reproduce an information signal recorded on the traced recording track;
   (b) head movement means for causing said reproducing head means to move over said disc-shaped recording medium in the radial direction thereof;
   (c) head-position-specifying signal output means for outputting a head-position-specifying signal to said head movement means to as to cause said reproducing head means to move to an arbitrary position in the radial direction for said disc-shaped recording medium;
   (d) high-band frequency component separating means for effecting separation of a high-band frequency component of the information signal reproduced by said reproducing head means;
   (e) low-band frequency component separating means for effecting separation of a low-band frequency component of said information signal reproduced by said reproducing head means;
   (f) variable-level control means for limiting, in accordance with the head-position-specifying signal output from said head-position-specifying signal output means, the level of said high-band frequency component separated from said information signal by said high-band frequency component separating means;
   (g) addition means arranged to add said high-band frequency component of said information signal whose level has been limited by said variable-level control means to said low-band frequency component which has been separated from said information signal by said low-frequency component separating means; and
   (h) control means for controlling the level of said high-band frequency component separated from said information signal by said high-band frequency component separating means, of said variable-level control means, in accordance with said head-position-specifying signal outputted from said head-position-specifying signal output means.

17. An information signal reproducing apparatus according to claim 16, wherein said control means includes DC-level signal output means arranged to receive said head-position specifying signal output from said head-position-specifying signal output means and then to output a DC-level signal corresponding to said input head-position specifying signal.

18. An information signal reproducing apparatus according to claim 17, wherein said variable level limiting means includes limiter means for limiting the level of the high-band frequency component of said information signal in accordance with said DC-level signal output from said DC-level signal output means.

19. An information signal reproducing apparatus according to claim 17, wherein said DC-level signal output means includes memory means which stores DC-level data corresponding to the head-position specifying signal output from said head-position-specifying signal output means, said memory means being arranged to output the DC-level data corresponding to the input head-position specifying signal.

* * * * *

UNITED STATES PATENT AND TRADEMARK OFFICE
CERTIFICATE OF CORRECTION

PATENT NO. : 4,984,102
DATED : January 8, 1991
INVENTOR(S) : Ryo Fujimoto

It is certified that error appears in the above-identified patent and that said Letters Patent is hereby corrected as shown below:

```
Col. 1, line 43.   After "emphasis" insert -- . --
Col. 4, line 41.   After "signal" insert -- . --
Col. 5, line 29.   Change "S2" to -- S1 --
Col. 8, line 8.    Delete "of" second occurrence
Col. 10, line 65.  Delete "the" first occurrence
Col. 15, line 23.  Change "operates" to -- operate --
Col. 15, line 49.  Change "a" to -- an --
Col. 22, line 66.  Change "for" to -- by --
Col. 23, line 5.   Change "aid" to -- said --
Col. 23, line 7.   Change "heat-" to -- head --
Col. 23, line 63.  After "emphasizing" insert -- a --
Col. 25, line 44.  change "to" 1st occurrence to --so--.
Col. 26, line 29.  Change "16" to -- 11 --
```

Signed and Sealed this

Twenty-first Day of July, 1992

Attest:

DOUGLAS B. COMER

*Attesting Officer*      *Acting Commissioner of Patents and Trademarks*